(12) United States Patent
Taoka et al.

(10) Patent No.: US 7,393,376 B2
(45) Date of Patent: Jul. 1, 2008

(54) CERAMIC FILTER FOR EXHAUST GAS EMISSION CONTROL

(75) Inventors: Noriyuki Taoka, Gifu (JP); Yutaka Yoshida, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 463 days.

(21) Appl. No.: 10/502,044

(22) PCT Filed: Mar. 17, 2003

(86) PCT No.: PCT/JP03/03183

§ 371 (c)(1),
(2), (4) Date: Jan. 24, 2005

(87) PCT Pub. No.: WO03/078026

PCT Pub. Date: Sep. 25, 2003

(65) Prior Publication Data

US 2006/0213163 A1 Sep. 28, 2006

(30) Foreign Application Priority Data

Mar. 15, 2002 (JP) .............................. 2002-072847

(51) Int. Cl.
*B01D 46/00* (2006.01)
*F01N 3/021* (2006.01)
(52) U.S. Cl. ........................ 55/523; 55/282.3; 55/385.3; 55/484; 55/524; 55/DIG. 10; 55/DIG. 30; 60/311

(58) Field of Classification Search ................ 55/282.2, 55/282.3, 385.3, 482, 483, 484, 523, 524, 55/DIG. 5, DIG. 10, DIG. 30; 60/311; 428/116, 428/117, 118
See application file for complete search history.

(56) References Cited

U.S. PATENT DOCUMENTS

| 4,276,071 A | * | 6/1981 | Outland ........................ 55/523 |
| 4,417,908 A | | 11/1983 | Pitcher, Jr. |
| 4,693,338 A | | 9/1987 | Clerc |
| 4,698,213 A | | 10/1987 | Shimozi et al. |
| 4,782,661 A | | 11/1988 | Motley et al. |

(Continued)

FOREIGN PATENT DOCUMENTS

DE 43 41 159 A1 6/1995

(Continued)

OTHER PUBLICATIONS

U.S. Appl. No. 09/926,795, filed Jan. 12, 1996.

(Continued)

*Primary Examiner*—Jason M Greene
(74) *Attorney, Agent, or Firm*—Oblon, Spivak, McClelland, Maier & Neustadt, P.C.

(57) ABSTRACT

A ceramic filter assembly that resists cracking. The ceramic filter assembly is formed by integrating a plurality of columnar honeycomb filters made of a porous ceramic sintered material with a ceramic sealing material layer and formed to have a substantially elliptical cross sectional shape. The honeycomb filters includes square columnar honeycomb filters in which the ratio between the lengths of their long sides and short sides is between 1.1 and 3.0. The honeycomb filters are arranged so that the long sides and the short sides are respectively parallel to the major axis and the minor axis of the assembly.

23 Claims, 10 Drawing Sheets

U.S. PATENT DOCUMENTS

| | | | |
|---|---|---|---|
| 5,242,871 | A | 9/1993 | Hashimoto et al. |
| 5,273,724 | A | 12/1993 | Bos |
| 5,456,965 | A | 10/1995 | Machida et al. |
| 5,686,039 | A | 11/1997 | Merry |
| 5,914,187 | A | 6/1999 | Naruse et al. |
| 5,930,994 | A | 8/1999 | Shimato et al. |
| 5,943,771 | A | 8/1999 | Schmitt |
| 6,159,578 | A | 12/2000 | Ichikawa |
| 6,317,976 | B1 | 11/2001 | Aranda et al. |
| 6,447,564 | B1 | 9/2002 | Ohno et al. |
| 6,565,630 | B2 | 5/2003 | Ohno et al. |
| 6,656,564 | B2 * | 12/2003 | Ichikawa et al. ............... 55/523 |
| 6,669,751 | B1 | 12/2003 | Ohno et al. |
| 6,770,116 | B2 | 8/2004 | Kojima |
| 7,138,002 | B2 * | 11/2006 | Hamanaka et al. ............ 55/523 |
| 2004/0031264 | A1 | 2/2004 | Kojima |
| 2004/0033175 | A1 | 2/2004 | Ohno et al. |
| 2004/0055265 | A1 | 3/2004 | Ohno et al. |
| 2004/0093858 | A1 * | 5/2004 | Aoki ........................... 60/311 |
| 2004/0161596 | A1 | 8/2004 | Taoka et al. |

FOREIGN PATENT DOCUMENTS

| | | | |
|---|---|---|---|
| DE | 296 11 788 U 1 | | 10/1996 |
| EP | 0 299 626 A2 | | 1/1989 |
| EP | 0 816 065 A1 | | 1/1998 |
| EP | 1 142 619 A1 * | | 10/2001 |
| JP | 60-65219 | | 4/1985 |
| JP | 62-114633 | | 5/1987 |
| JP | 2-4500 | | 1/1990 |
| JP | 6-241018 | * | 8/1994 |
| JP | 7-204500 | | 8/1995 |
| JP | 2001-162119 | | 6/2001 |
| JP | 2001-170426 | | 6/2001 |
| JP | 2002-054422 | | 2/2002 |
| JP | 2002-273130 | * | 9/2002 |
| JP | 2003-117320 | | 4/2003 |
| WO | WO 03/021089 A1 | | 3/2003 |
| WO | 03 071105 | | 8/2003 |
| WO | 03/074848 | | 9/2003 |
| WO | 03 080219 | | 10/2003 |
| WO | 03 081001 | | 10/2003 |
| WO | 03 084640 | | 10/2003 |
| WO | 03 093657 | | 11/2003 |
| WO | 03/093658 | | 11/2003 |
| WO | 2004-031100 | | 4/2004 |
| WO | 2004/031101 | | 4/2004 |
| WO | 2004-076027 | | 9/2004 |
| WO | WO 2004/106702 A1 | | 12/2004 |
| WO | WO 2004/111398 A1 | | 12/2004 |
| WO | WO 2004/113252 A1 | | 12/2004 |
| WO | WO 2005/000445 A1 | | 1/2005 |
| WO | WO 2005/002709 A1 | | 1/2005 |
| WO | WO 2005/005018 A1 | | 1/2005 |
| WO | WO 2005/044425 A1 | | 5/2005 |

OTHER PUBLICATIONS

U.S. Appl. No. 10/129,126, filed Jan. 13, 2000.
U.S. Appl. No. 10/787,089, filed Mar. 17, 2003.
U.S. Appl. No. 10/490,206, filed Sep. 2, 2004, Hong et al.
U.S. Appl. No. 10/490,205, filed Sep. 9, 2004, Komori et al.
U.S. Appl. No. 10/493,056, filed Aug. 17, 2004, Hong et al.
U.S. Appl. No. 10/502,054, filed Jul. 30, 2004, Kudo et al.
U.S. Appl. No. 10/502,045, filed Jul. 29, 2004, Kudo et al.
U.S. Appl. No. 10/502,044, filed Jul. 29, 2004, Taoka et al.
U.S. Appl. No. 10/506,247, filed Sep. 9, 2004, Kudo et al.
Patent Abstracts of Japan, JP 2002-060279, Feb. 26, 2002.
Patent Abstracts of Japan, JP 2000-279728, Oct. 10, 2000.

* cited by examiner

CERAMIC FILTER FOR EXHAUST GAS EMISSION CONTROL

TITLE OF THE INVENTION

CROSS REFERENCE TO RELATED APPLICATIONS

This application claims priority from Japanese Patent Application No. 2002-72847, filed on Mar. 15, 2002, the contents of which are hereby incorporated herein reference in their entirety.

FIELD OF THE INVENTION

The present invention relates to ceramic filters for exhaust gas emission control, and more particularly, to a ceramic filter assembly in which a plurality of filters made of a ceramic sintered material are integrated, a canning body, and a columnar honeycomb filter that may be used when manufacturing the same.

DESCRIPTION OF THE RELATED ART

The number of automobiles is dramatically increasing, and in proportion thereto, the amount of exhaust gas exhausted from internal combustion engines of automobile is also rapidly increasing. Various substances contained in the exhaust gas, especially from diesel engines cause pollution, and thus presently, are seriously affecting the world environment. Reports have been recently made on study results that fine particles (diesel particulate) in the exhaust gas may sometimes cause allergic symptoms or reduce sperm counts. A measure for eliminating the fine particles in the exhaust gas is thus an urgent problem that must be coped with for the sake of mankind.

Accordingly, a variety of exhaust gas purifying devices have been proposed in the prior art. A typical exhaust gas purifying device has a configuration in which a casing is arranged on an exhaust pipe coupled to an exhaust manifold of an engine, and a filter including fine holes is arranged therein. The filter may be made of, besides metal and metal alloy, ceramic. A known example of a filter made of ceramic includes a honeycomb filter made of cordierite. Recently, a porous silicon carbide sintered material is often used as the material forming the filter because of the advantages of, for example, high thermal resistance, high mechanical strength, high collecting efficiency, chemical stability, and small pressure loss (e.g., Japanese Laid-Open Patent Publication No. 2001-162119).

The honeycomb filter has multiple cells (through-holes) extending in an axial direction thereof. When exhaust gas passes through the filter, the fine particles are trapped at the cell walls of the filter. As a result, the fine particles are removed from the exhaust gas.

However, since the honeycomb filter made of a porous silicon carbide sintered material has large thermal expansion, as the size of the filter increases, cracks tend to occur in the filter during use at high temperature. Thus, a technique for manufacturing one large ceramic filter assembly by integrating a plurality of small filter pieces has been recently proposed as a means for avoiding damage caused by cracks.

A general method for manufacturing the above mentioned assembly will now be briefly introduced.

First, a square columnar shaped honeycomb molded product is formed by continuously extruding a ceramic material through a metal mold die of an extruder. After cutting the honeycomb molded product into equal lengths, each cut piece is sintered to produce a filter. After the sintering, the outer surfaces of the filters are adhered to each other by a ceramic sealing material layer to bundle and integrate the filters. Consequently, the desired ceramic filter assembly is completed. A mat thermal insulation material including ceramic fibers and the like is wrapped around the outer surface of the ceramic filter assembly. The assembly in such state is accommodated within a casing arranged on the exhaust pipe.

[Patent Publication 1]
Japanese Patent Publication No. 2001-162119

In case of a filter having an integrated structure and a cross section that is oblong, such as, a substantially elliptical shape, it is found that cracks are more likely to occur in filters located at peripheral portions rather than at central portions of the assembly. When observing the filter assembly after repeating reproduction a number of times and dividing the filter assembly, a slight amount of burnt residue of soot was found for the first time in filters located at the peripheral portions. It can thus be presumed that a temperature difference exists between individual honeycomb filters. This causes a difference in the reproduction level during a single reproducing process. Further, the soot residue causes a difference in the subsequent collecting amount, and the temperature stress due to the difference in the amount of soot during reproduction causes cracks in the honeycomb filter.

SUMMARY OF THE INVENTION

It is an object of the present invention to provide a ceramic filter assembly having superior strength. It is a further aspect of the present invention to provide a columnar honeycomb filter suitable for manufacturing such a ceramic filter assembly.

The inventor of the present invention has recognized that in an exhaust gas purifying device connected to an engine through a pipe having an inner diameter smaller than the filter, a temperature difference is produced between a central portion and a peripheral portion of the filter assembly when the pipe is conically enlarged just before the filter.

Further, the inventor of the present invention has recognized that in a filter assembly having an oblong shape such as substantially elliptical shape, a large temperature difference is produced between the peripheral portion in the major axis direction and the peripheral portion in the minor axis due to difference in the distance from the central portion. The inventor has confirmed that this temperature difference prevents uniform reproduction, produces residual soot, and cause cracking when the filter exceeds its strength limit.

Based on the above knowledge, the inventor has conducted tests and research to manufacture an oblong filter assembly enabling uniform temperature rise. As a result, it has become understood that if the ceramic filter assembly is manufactured so as to satisfy certain conditions, thermal stress would be absorbed and a ceramic filter assembly having superior strength would be manufactured.

Accordingly, a conclusion has been reached that in order to uniformly transfer heat from the central portion to the peripheral portion, a condition in which the thermal conductivity in the major axis direction is higher than the thermal conductivity in the minor axis direction, particularly, a condition in which the heat insulating effect is increased at the peripheral portion of the assembly in the major axis direction compared to the peripheral portion in the minor axis direction should be satisfied.

The present inventions provides a ceramic filter assembly integrated by adhering together a plurality of columnar honeycomb filters made of a porous ceramic sintered material with a ceramic sealing material layer and having a substantially elliptical cross sectional shape when cut parallel to end faces of the plurality of honeycomb filters.

In a first aspect, the plurality of honeycomb filters include a honeycomb filter having a rectangular cross sectional shape when cut parallel to the end faces and provided with a long side having length B1 and a short side having length B2 in which the ratio B1/B2 is between 1.1 and 3.0. The honeycomb filter is arranged so that the long side and the short side of the honeycomb filter are respectively parallel to the major axis and minor axis of the assembly.

In a second aspect of the present invention, each honeycomb filter includes a plurality of rectangular cells extending along an axis of the filter with each cell provided with a long side having length C1 and a short side having length C2 in which the ratio C1/C2 is between 1.1 and 3.0. The plurality of honeycomb filters are arranged so that the long sides of the cells are parallel to the major axis of the assembly and the short sides of the cells are parallel to the minor axis of the assembly.

In a third aspect, each honeycomb filter includes a plurality of rectangular cells extending along an axis of the filter and defined by relatively thick cell walls and relatively thin walls that are orthogonal to each other. The plurality of honeycomb filters are arranged so that the relatively thick cell walls are parallel to the major axis of the assembly and the relatively thin cell walls are parallel to the minor axis of the assembly.

In a fourth aspect, the ceramic sealing material layer includes a first sealing material layer extending parallel to the major axis of the assembly and a second sealing material layer extending orthogonal to the major axis of the assembly. The first sealing material layer is thicker than the second sealing material layer.

In a fifth aspect, the ceramic sealing material layer includes a first sealing material layer parallel to the major axis of the assembly and a second sealing material layer orthogonal to the major axis of the assembly. The first sealing material layer has a thermal conductivity lower than the thermal conductivity of the second sealing material layer.

In a sixth aspect, the ceramic filter assembly further includes an outer sealing material layer made of ceramic and formed on the periphery of the assembly. The outer sealing material layer includes a first portion located along an extension of the major axis of the assembly that is thicker than a second portion located along an extension of the minor axis of the assembly.

In a seventh aspect, a ceramic filter assembly integrated by adhering together a plurality of columnar honeycomb filters made of a porous ceramic sintered material with an inner sealing material layer made of ceramic and has a generally elliptical cross sectional shape when cut parallel to end faces of the plurality of honeycomb filters is provided. A tubular casing accommodates the ceramic filter assembly. A thermal insulation material is arranged between the casing and the ceramic filter assembly. The thermal insulation material includes a first portion located along an extension of the major axis of the assembly and a second portion located along an extension of the minor axis of the assembly. The first portion is thicker than the second portion.

In an eighth aspect, a columnar honeycomb filter made of a porous ceramic sintered material is provided. The honeycomb filter has a rectangular cross sectional shape when cut parallel to an end face thereof and is provided with a long side having length B1 and a short side having length B2 in which the ratio the B1/B2 is 3.0 or less.

In a ninth aspect, the columnar honeycomb includes a plurality of cells, extending along the axial direction thereof, and an end face. Each cell has a rectangular cross sectional shape when cut parallel to the end face. Each cell is provided with a long side having length C1 and a short side having length C2 in which the ratio C1/C2 is 3.0 or less.

In a tenth aspect, a columnar honeycomb filter made of a porous ceramic sintered material includes a plurality of rectangular cells extending along the axial direction of the honeycomb filter. Each rectangular cell is defined by a relatively thick cell wall and a relatively thin cell wall that are orthogonal to each other.

In an eleventh aspect, in a ceramic filter assembly having a substantially elliptical cross sectional shape, when a hypothetical first straight line intersects the generally elliptical contour at two points in which the distance therebetween is maximum and a hypothetical second straight line orthogonal to the first straight line intersects the generally elliptical contour at two points in which the distance therebetween is maximum, the number of sealing material layers that the first straight line of the assembly traverses is less than or equal to the number of sealing material layers that the second straight line traverses.

DETAILED DESCRIPTION OF THE PREFERRED EMBODIMENTS

An exhaust gas purifying device 1 according to one embodiment of the present invention will now be described.

Figure 1:
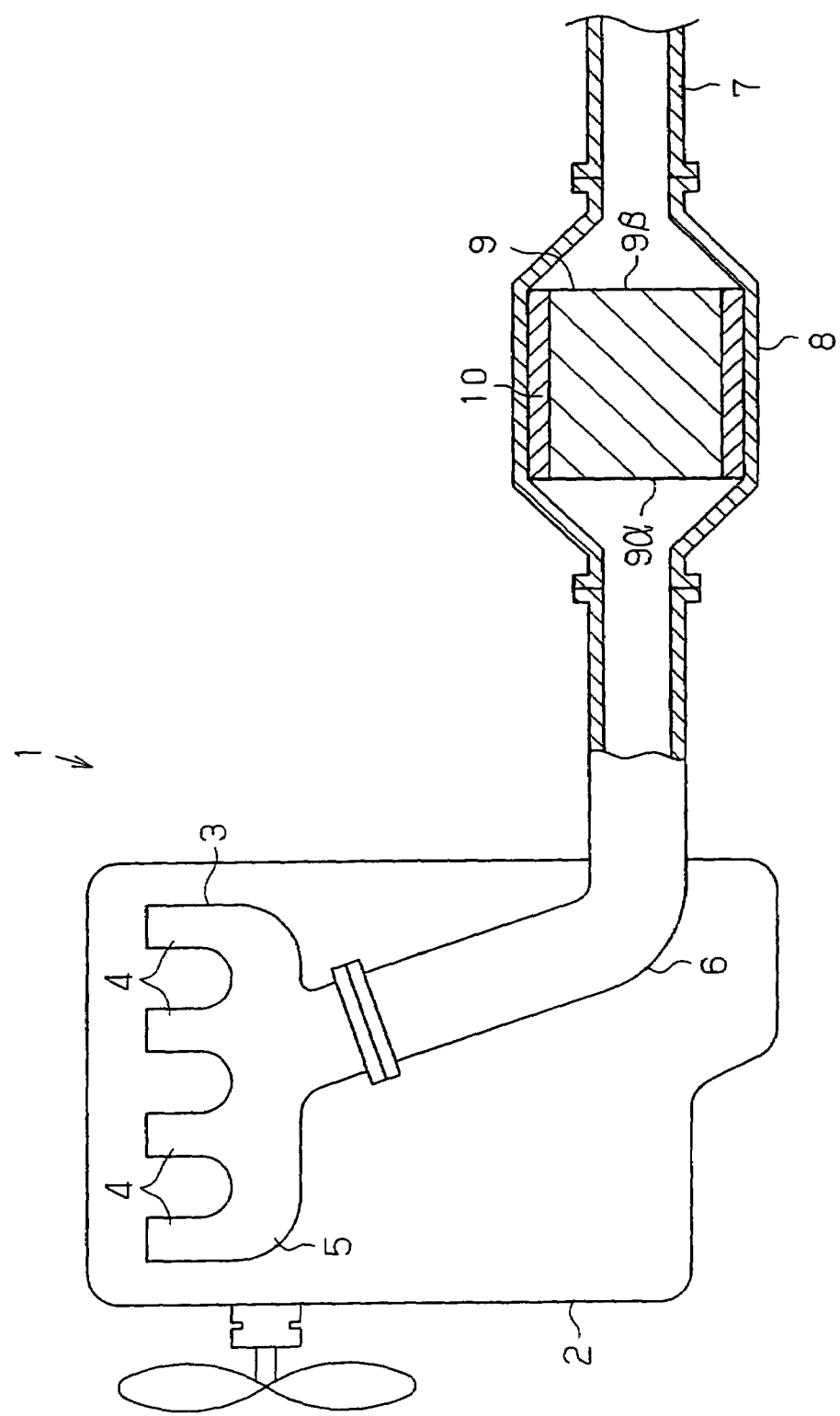
FIG. 1 is a schematic view showing an exhaust gas purifying device including a ceramic filter assembly according to one embodiment of the present invention.

As shown in FIG. 1, the exhaust gas purifying device 1 is a device for purifying exhaust gas discharged from a diesel engine 2 serving as an internal combustion engine. The diesel engine 2 includes a plurality of cylinders (not shown). Each cylinder is connected to a branch pipe 4 of an exhaust manifold 3 that is made of a metal material. Each branch pipe 4 is connected to a single manifold body 5. Accordingly, the exhaust gas discharged from each cylinder pipe is concentrated at one location.

A first exhaust pipe 6 and a second exhaust pipe 7 made of a metal material are arranged downstream of the exhaust manifold 3. An upstream end of the first exhaust pipe 6 is coupled to the manifold body 5. A tubular casing 8, also made of a metal material, is arranged between the first exhaust pipe 6 and the second exhaust pipe 7. An upstream end of the casing 8 is coupled to a downstream end of the first exhaust pipe 6, and a downstream end of the casing 8 is coupled to an upstream end of the second exhaust pipe 7. The exhaust gas flows through the first exhaust pipe 6, the casing 8, and the second exhaust pipe 7.

As shown in FIG. 1, a central portion of the casing 8 has a greater diameter than the exhaust pipes 6, 7. That is, the interior of the casing 8 is larger than that of the exhaust pipes 6, 7. A ceramic filter assembly 9 is accommodated in the casing 8. The exhaust gas purifying device 1 accommodating the ceramic filter assembly 9 in the casing 8 is referred to as a canning body.

A thermal insulation material 10 is arranged between the outer surface of the assembly 9 and the inner surface of the casing 8. The thermal insulation material 10 is a mat-shaped body formed from ceramic fibers, and has a thickness of 2 mm to 60 mm. The thermal insulation material 10 preferably has an elastic structure and has a function for releasing thermal stress. The thermal insulation material 10 minimizes energy loss during reproduction by preventing heat from escaping from the outermost portion of the assembly 9. Further, due to the elastic structure, the ceramic filter assembly 9 is prevented from being displaced by the pressure of the exhaust gas and vibrations when the vehicle is traveling.

Figure 2:
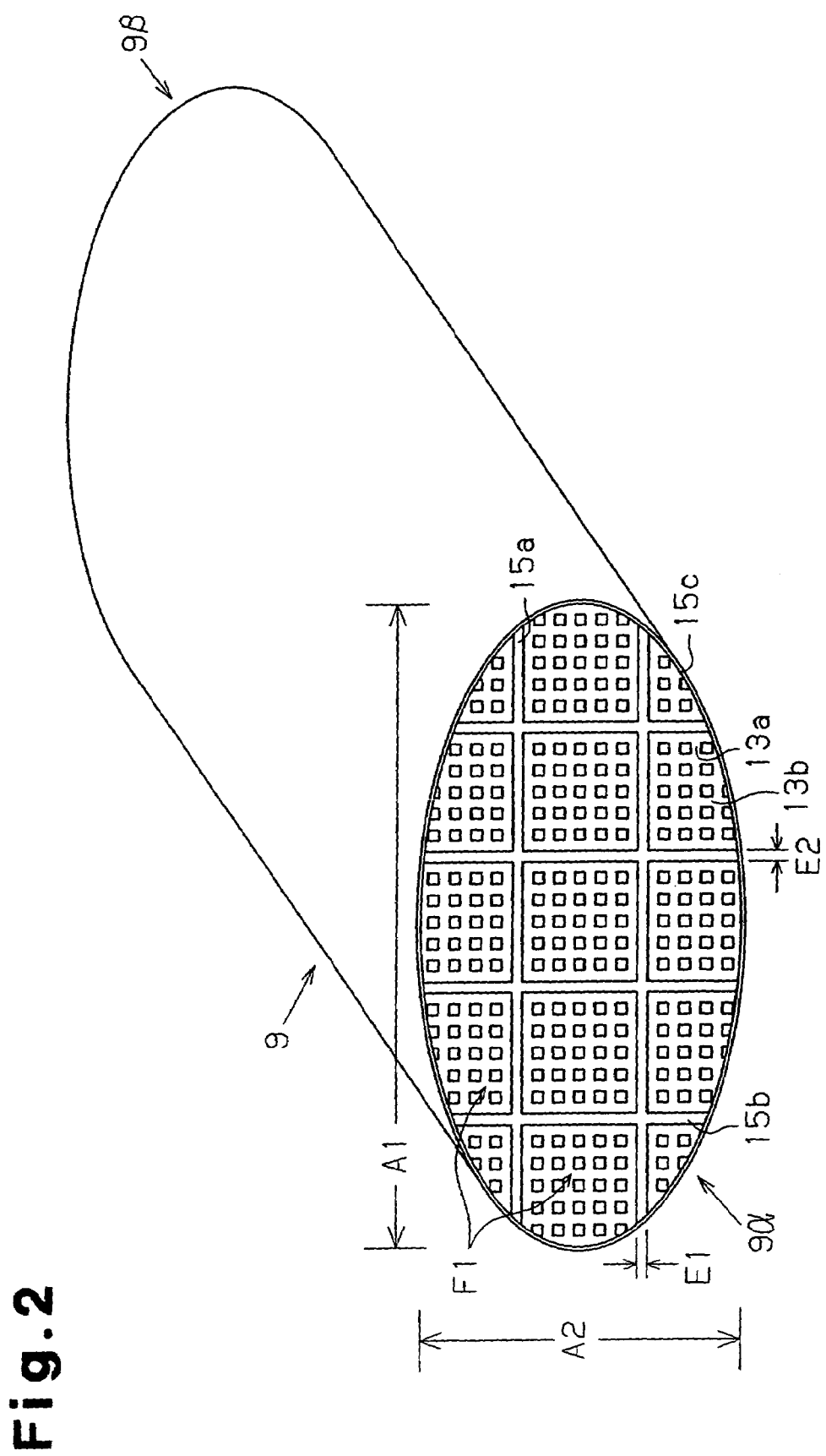
FIG. 2 is a perspective view showing the ceramic filter assembly of FIG. 1.
Figure 3:
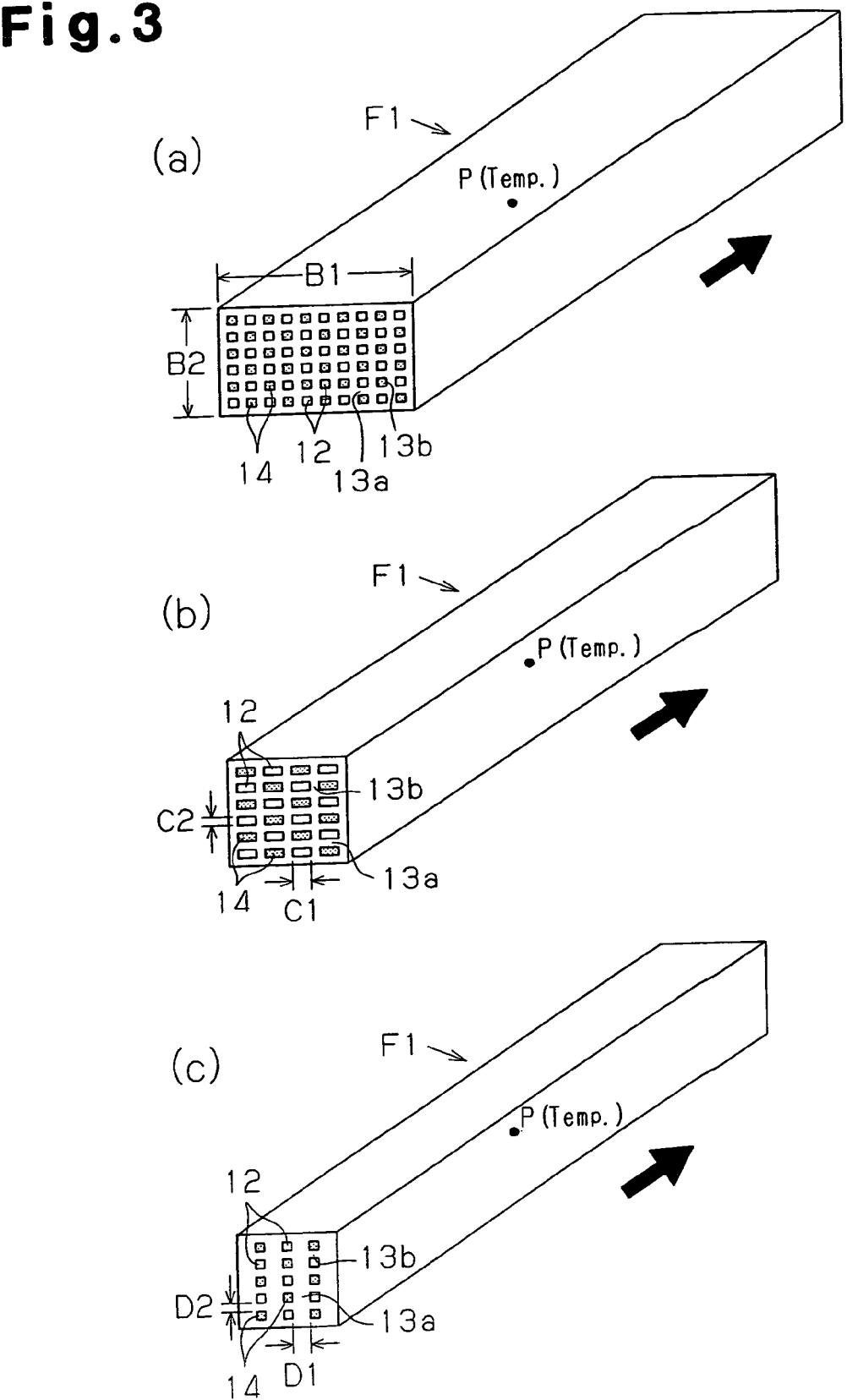
FIG. 3(a) is a perspective view showing a honeycomb filter having a rectangular cross section.
FIG. 3(b) is a perspective view showing a honeycomb filter having a rectangular cell.
FIG. 3(c) is a perspective view showing a honeycomb filter having a plurality of cells partitioned by cell walls that are orthogonal to each other and have different thicknesses.
Figure 4:
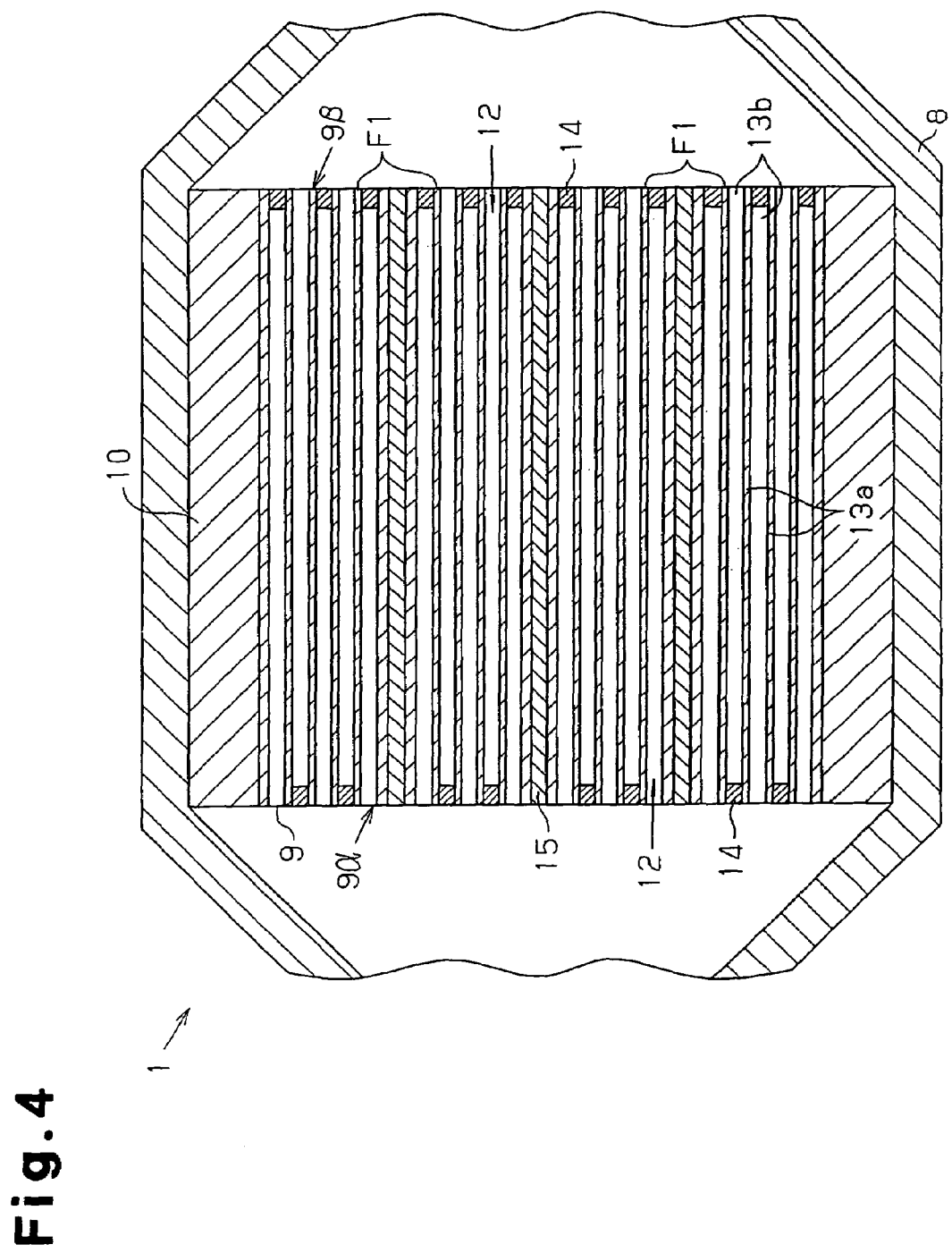
FIG. 4 is a cross sectional view showing the exhaust gas purifying device of FIG. 1.

The ceramic filter assembly 9 of the present embodiment is for removing diesel particulates as mentioned above, and is thus normally referred to as a diesel particulate filter (DPF). As shown in FIG. 2 and FIG. 4, the assembly 9 of the present embodiment is formed by bundling and integrating a plurality of honeycomb filters F1. Among the plurality of honeycomb filters F1, the honeycomb filters F1 located at the central portion of the assembly 9 each has a square columnar shape, as shown in FIGS. 3(a) to 3(C). Honeycomb filters F1 having a shape other than a square columnar shape are arranged around the square columnar shaped honeycomb filters F1. As a result, when seen as a whole, the ceramic filter assembly 9 has a substantially elliptic cylinder shape with a substantially elliptical cross sectional shape.

Figure 5:
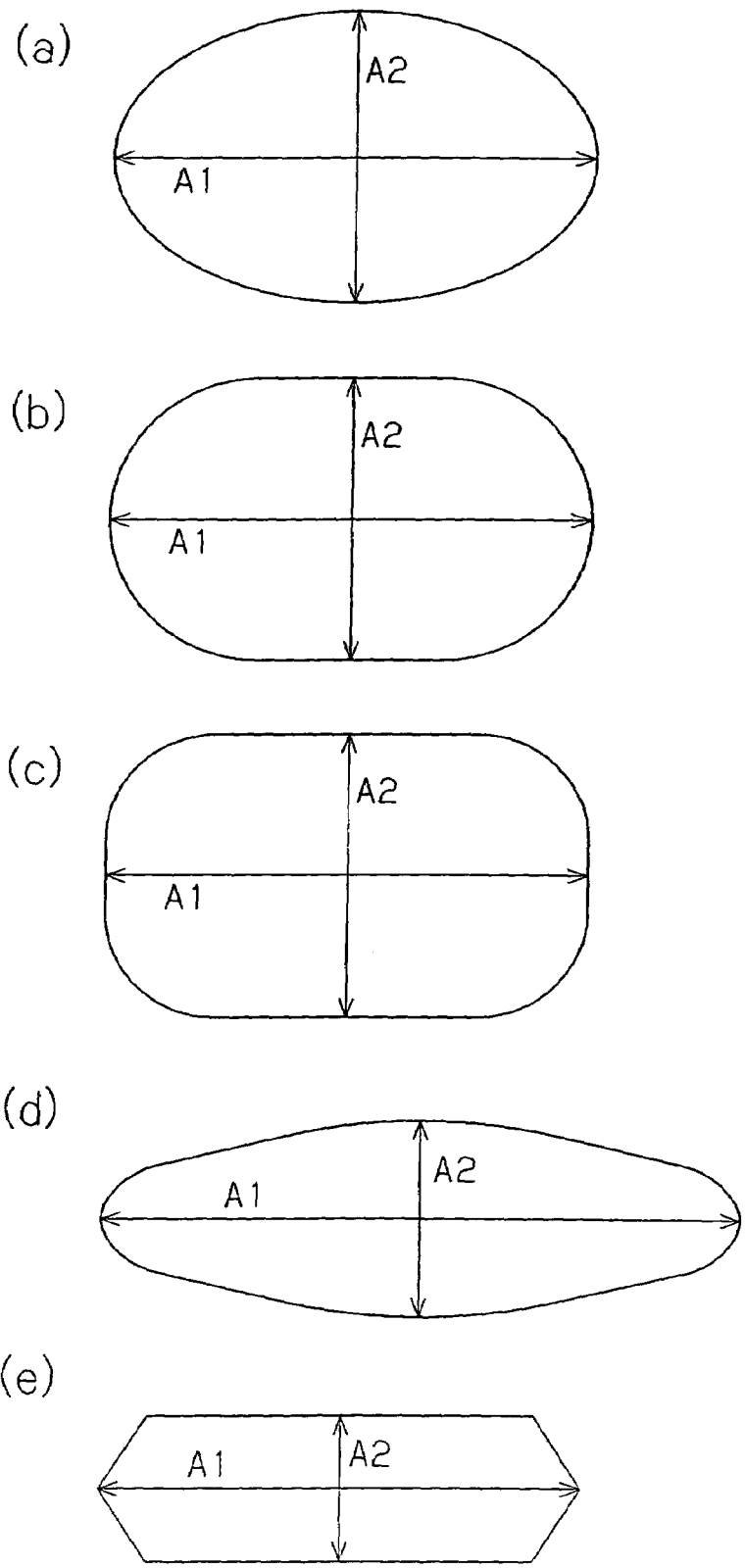
FIGS. 5(a) to 5(e) are views showing cross sectional shapes of the ceramic filter assembly.

The cross section of the assembly 9 of the present invention is substantially elliptical. "Substantially elliptical" is not limited only to an ellipse configured only by curves, as shown in FIG. 5(a). An oblong elliptical shape partially having, for example, straight lines as shown in FIG. 5(b), more specifically, a pair of straight parallel lines to each other is also included. The straight portion may only be at one section, or may be at more than three sections. "Oblong" includes shapes as shown in FIG. 5(a), FIG. 5(b), FIG. 5(c), FIG. 5(d), and FIG. 5(e). The lengths of the major axis and minor axis of the assembly 9 are defined as A1 and A2 (A1>A2), respectively. If the substantially elliptical shape is an ellipse, a long axis passing a focal point is the major axis, and a short axis orthogonal thereto is the minor axis. The dimensions A1 and A2 are preferably 500 mm or less. If the dimensions A1 and A2 are greater than 500 mm, it becomes difficult to manufacture the assembly with sufficient strength.

The length L (mm) of each honeycomb filter F1 is defined as the dimension of the direction in which the exhaust gas or fluid subjected to treatment flows (direction orthogonal to the end face of the filter). When each honeycomb filter F1 is cut perpendicular to the flow direction of the exhaust gas (that is, cut parallel to the end face of the filter), the cross section is rectangular. The lengths (outside dimension) of the long side and the short side of the cross section of the honeycomb filter F1 are defined as B1 and B2 (B1≧B2), respectively. Each of the dimensions B1 and B2 are preferably 110 mm or less. This is because the strength of the filter F1 decreases significantly when the dimensions B1 and B2 are greater than 110 mm.

It is preferred that the ratio of B1/B2 be 3 or less. This is because if the ratio of B1/B2 is greater than 3, thermal stress is more likely to act on the filter F1 due to thermal shock, and cracks are more likely to occur.

The honeycomb filter F1 is made of a porous silicon carbide sintered material, which is one type of porous ceramic sintered material. The silicon carbide sintered material is used because of its excellent thermal resistance and heat conductivity when compared to other ceramics. Instead of silicon carbide, the sintered material may be made of, for example, silicon nitride, sialon, alumina, cordierite, mullite, and the like.

Silicic ceramics in which metal silicon is mixed to the above mentioned ceramic, and ceramics bonded with silicon and silicate compound may also be used. This is because the metal silicon prevents cracks caused by thermal shock and the like.

It is preferred that 5 to 50 parts by weight of metal silicon is included per 100 parts by weight of silicon carbide. If the amount of metal silicon is too small, the adhesive strength of the filter F1 decreases, and if the amount is too large, the filter F1 becomes dense and the properties necessary as the filter cannot be obtained.

As shown in, for example, FIG. 3(a) to FIG. 3(c), each honeycomb filter F1 has a so-called honeycomb structure. The honeycomb structure is adopted because the pressure loss is small even if the collected amount of fine particles increases. Each honeycomb filter F1 includes a plurality of cells 12 (through-holes) having a rectangular cross section, regularly formed in the axial direction thereof. The lengths of the sides (inner diameter) of the rectangular cross section of each cell 12 are defined as C1 and C2 (C1≧C2). The cells 12 are partitioned from each other by thin cell walls 13a and 13b. The thickness of the cell walls 13a, 13b are defined as D1 and D2 (D1≧D2), respectively.

The ratio C1/C2 is preferably 3 or less. This is because if the ratio C1/C2 is greater than 3, thermal stress is more likely to act on the filter F1 due to thermal shock, and cracks are more likely to occur.

The ratio D1/D2 is preferably 3 or less. This is because if the ratio D1/D2 is greater than 3, thermal stress is more likely to act on the filter F1 due to thermal shock, and cracks are more likely to occur.

An oxidation catalyst made of platinum group elements (e.g., Pt) and other metal elements and oxides thereof are carried by the cell walls 13a and 13b. Each cell 12 is sealed with a plug 14 (made of a porous silicon carbide sintered material in this embodiment) at either one of the end faces 9α and 9β of the filter F1. A checker-board like pattern is formed on the end faces 9α and 9β by the sealed cells 12. The density of the cell 12 is preferably approximately 200 cells/square inch. About half of the cells 12 are open at the upstream side end face 9α and the remaining cells 12 are open at the downstream side end face 9β. The lengths C1, C2 of the sides of the cell 12 are preferably set between 0.5 mm and 5.0 mm. If the dimensions C1, C2 are greater than 5.0 mm, the filtering surface area of the cell walls 13a and 13b becomes small. This lowers the performance of the filter F1. On the other hand, if the dimensions C1 and C2 are smaller than 0.5 mm, the filter F1 becomes very difficult to manufacture. The thicknesses D1, D2 of the cell walls 13a, 13b are preferably set between 0.1 to 0.5 mm. This is because if the dimensions D1 and D2 are greater than 0.5 mm, the fluid resistance (pressure loss) produced by the filter F1 becomes high and is thus not satisfactory. If, on the other hand, the dimensions D1 and D2 are smaller than 0.1 mm, the strength of the filter F1 becomes insufficient.

The average pore diameter of the honeycomb filter F1 is preferably between 1 μm and 50 μm, and more preferably, between 5 μm and 20 μm. If the average pore diameter is less than 1 μm, the honeycomb filter F1 would often become clogged by the deposition of fine particles. If, on the other hand, the average pore diameter exceeds 50 μm, small fine particles cannot be collected. This would reduce the collecting efficiency.

The porosity of the honeycomb filter F1 is preferably between 30% and 80%, and more preferably, between 40% and 60%. If the porosity is less than 30%, the honeycomb filter F1 becomes too dense and may not allow the passage of exhaust gas. If the porosity exceeds 80%, the amount of gaps formed in the honeycomb filter F1 becomes excessive. This would weaken the strength and decrease the collecting efficiency of the fine particles.

When a porous silicon carbide sintered material is selected, the thermal conductivity of the honeycomb filter F1 is preferably between 5 W/m·K and 80 W/m·K, and more preferably, between 30 W/m·K and 70 W/m·K.

Figure 10:
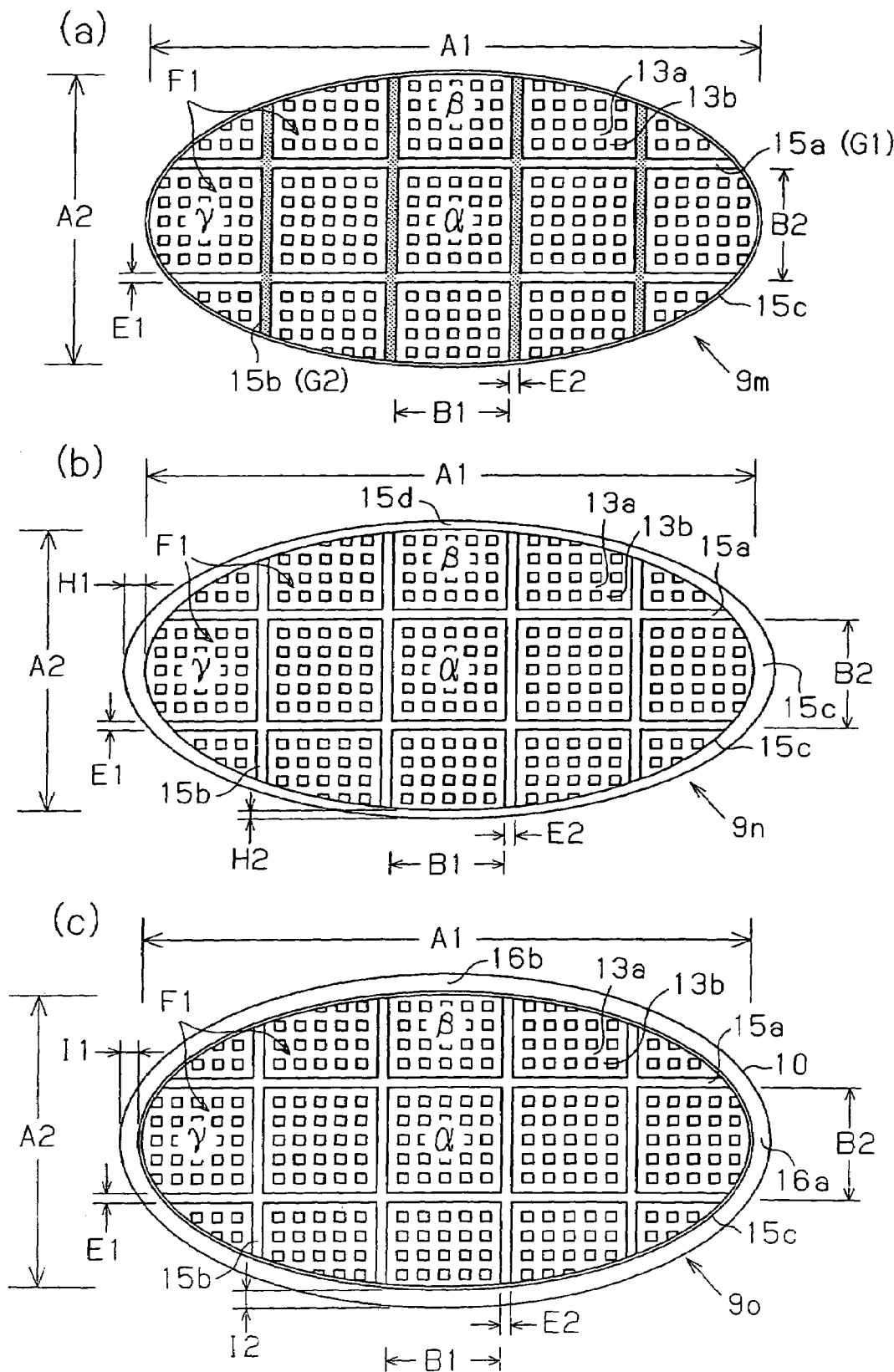
FIG. 10(a) is a side-view of the filter assembly integrated by a sealing material layer of different thermal conductivity.
FIG. 10(b) is a side view of the filter assembly including an exterior sealing material layer of uneven thickness.
FIG. 10(c) is a side view of the filter assembly including a thermal insulation material of uneven thickness.

As shown in FIG. 2, FIG. 4, and FIG. 10(a), the outer surfaces of the honeycomb filters F1 are adhered to each other by means of ceramic sealing material layers 15a and 15b. The ceramic sealing material layers 15a and 15b are defined to be of the same type for those that are parallel to each other. Hereinafter, the ceramic sealing material layers parallel to the long side of the assembly 9 are denoted by 15a, the thickness of which is E1, the thermal conductivity of which is G1. The ceramic sealing material layers parallel to the short side of the assembly 9 is denoted by 15b, the thickness of which is E2 (E1≧E2), and the thermal conductivity of which is G2. The ratio of E1/E2 is preferably equal to or less than 5. If the ratio E1/E2 is greater than 5, the heat conduction reverses between the short side direction and the long side direction, and thus a uniform temperature rise of the assembly 9 becomes difficult. The ratio E1/E2 is preferably 1.05 or greater. If the ratio E1/E2 is less than 1.05, thermal conduction in the direction of the long side becomes difficult. Thus, uniform temperature rise of the assembly 9 becomes difficult. This produces soot and cracks become likely to occur.

If the thicknesses of the sealing material layers 15a and 15b are the same, the thermal conductivity G1 and G2 of both sealing material layers 15a and 15b may be adjusted by differing the compositions (compound) of the sealing material layers 15a and 15b from each other. In this case, the ratio G1/G2 is preferably 0.20 or greater. If the ratio G1/G2 is smaller than 0.20, the thermal conduction reverses between the short side direction and the long side direction, and thus a uniform temperature rise of the assembly 9 becomes difficult. The ratio G1/G2 is preferably 0.7 or less. If the ratio G1/G2 is greater than 0.7, the thermal conduction in the direction of the long side becomes difficult. This produces soot and cracks become likely to occur.

The ceramic sealing material layers 15a, 15b of the present invention will now be described in detail.

The thicknesses E1 and E2 of the sealing material layers 15a and 15b are preferably between 0.3 mm and 3 mm, and more preferably between 0.5 mm and 2 mm. If the thicknesses E1 and E2 exceed 3 mm, the thermal resistance of the sealing material layers 15a and 15b become large even if the thermal conductivity is high, thus inhibiting the thermal conduction between the honeycomb filters F1. The percentage of the honeycomb filters F1 occupying the assembly 9 also relatively decreases, thus leading to lower filtering performance. If, on the other hand, the thicknesses E1 and E2 of the sealing material layers 15a and 15b are less than 0.3 mm, the thermal resistance will not be large but the force adhering the honeycomb filters F1 to each other becomes insufficient, and thus the assembly 9 is likely to break.

The sealing material layers 15a and 15b include at least inorganic fibers, an inorganic binder, an organic binder, and inorganic particles. Further, the sealing material layers 15a and 15b preferably made of an elastic material formed by bonding the inorganic fibers and the inorganic particles with the inorganic binder and the organic binder.

The inorganic fiber contained in the sealing material layers 15a and 15b include at least one or more types of ceramic fiber selected from silica-alumina fiber, mullite fiber, alumina fiber, and silica fiber. Among these fibers, silica-alumina ceramic fiber is particularly preferable. This is because silica-alumina ceramic fiber has excellent elasticity and exhibits thermal stress absorbing performance.

The content of the silica-alumina ceramic fiber in the sealing material layers 15a and 15b is 10% by weight to 70% by weight, preferably 10% by weight to 40% by weight, and more preferably, 20% by weight to 30% by weight in solid content. If the content of the silica-alumina ceramic fiber is less than 10% by weight in the solid content, the effect as an elastic body decreases. If the content of the silica-alumina ceramic fiber exceeds 70% by weight, not only does the thermal conductivity decrease, but elasticity also decreases.

Shot content in the silica-alumina ceramic fiber is 1% by weight to 10% by weight, preferably 1% by weight to 5% by weight, and more preferably, 1% by weight to 3%. If the shot content is less than 1% by weight, manufacturing becomes difficult. If, on the other hand, the shot content exceeds 50% by weight, the outer surface of the honeycomb filter F1 tends to be damaged.

The fiber length of the silica-alumina ceramic fiber is 1 μm to 100 mm, preferably, 1 μm to 50 mm, and more preferably, 1 μm to 20 mm. If the fiber length is shorter than 1 μm, an elastic structure cannot be formed. If the fiber length exceeds 100 mm, fuzzballs of fibers are formed. This lowers dispersion of the inorganic fine particles. Further, it becomes difficult to make the sealing material layers 15a and 15b less than or equal to 3 mm, and the thermal conductivity between the honeycomb filters F1 cannot be improved.

The inorganic binder contained in the sealing material layers 15a and 15b is preferably at least one or more types of colloidal sol selected from silica sol and alumina sol. Among these sols, silica sol is particularly preferable. This is because silica sol is easy to obtain, easily becomes $SiO_2$ by performing sintering, and is thus suitable as an adhesive agent under high temperatures. Furthermore, silica sol has superior insulation.

The content of the silica sol in the sealing material layers 15a and 15b is 1% by weight to 30% by weight, preferably, 1% by weight to 15% by weight, and more preferably, 5% by weight to 9% by weight in solid content. If the content of the silica sol is less than 1% by weight, the adhesion strength decreases. If the content of the silica sol exceeds 30% by weight, this may reduce thermal conductivity.

The organic binder contained in the sealing material layers 15a and 15b is preferably a hydrophilic organic macromolecule, and more preferably, at least one or more types of polysaccharide selected from polyvinyl alcohol, methyl cellulose, ethyl cellulose, and carboxymethyl cellulose. Among these, carboxymethyl cellulose is particularly preferable. This is because carboxymethyl cellulose produces suitable fluidity for the sealing material layers 15a and 15b and thus exhibits excellent adhesiveness under normal temperatures.

The content of the carboxymethyl cellulose in the sealing material layers 15a and 15b is 0.1% by weight to 5.0% by weight, preferably, 0.2% by weight to 1.0% by weight, and more preferably, 0.4% by weight to 0.6% by weight in solid content. If the content of the carboxymethyl cellulose is less than 0.1% by weight, migration can not be sufficiently suppressed. "Migration" is a phenomenon in which the binder in the sealing material layers 15a and 15b migrates as the solvent is dried and removed when the sealing material layers 15a and 15b filled between the subjected sealing body cure. If the content of the carboxymethyl cellulose exceeds 5% by weight, the organic binder is burnt by the high temperature and the strength of the sealing material layers 15a and 15b is lowered.

The inorganic particles contained in the sealing material layers 15a and 15b is preferably an elastic material using a whisker or at least one or more types of inorganic powder selected from silicon carbide, silicon nitride, and boron nitride. Such carbides and nitrides have very large thermal conductivities, and are arranged on the ceramic fiber surface or on the surface and the inside of the colloidal sol and contribute to the enhancement of thermal conduction.

Among the inorganic particles of the above carbides and nitrides, silicon carbide powder is particularly preferable. This is because silicon carbide has an extremely high thermal conductivity, and in addition, has affinity for ceramic fiber. Moreover, this is because the honeycomb filter F1 serving as the subjected sealing body is of the same type, in other words, is made of porous silicon carbide in the present embodiment.

The content of silicon carbide powder is 3% by weight to 80% by weight, preferably, 10% by weight to 60% by weight, and more preferably, 20% by weight to 40% by weight in solid content. If the content of the silicon carbide powder is less than 3% by weight, the thermal conductivity of the sealing material layers 15a and 15b decreases and causes the sealing material layers 15a and 15b to remain as a large thermal resistance. If, on the other hand, the content exceeds 80% by weight, the adhesion strength under a high temperature decreases.

The particle diameter of the silicon carbide powder is between 0.01 μm and 100 μm, preferably, between 0.1 μm and 15 μm, and more preferably between 0.1 μm and 10 μm. If the particle diameter exceeds 100 μm, the adhesive force and thermal conductivity decrease. If the particle diameter is less than 0.01 μm, the cost of the sealing material layers 15a and 15b increases.

The procedures for manufacturing the above mentioned ceramic filter assembly 9 will now be described.

First, a ceramic ingredient slurry used in an extrusion molding process, a sealing paste used in an end face sealing process, and a sealing material layer forming paste used in a filter adhesion process are prepared in advance.

The ceramic ingredient slurry is formed by mixing and kneading a predetermined amount of silicon carbide powder, organic binder, and water (in some cases, metal silicon is also added). The sealing paste is formed by mixing and kneading silicon carbide powder, organic binder, lubricant, plasticizer, and water. The sealing material layer forming paste is formed by mixing and kneading predetermined amounts of inorganic fibers, inorganic binder, organic binder, inorganic particles, and water.

Next, the ceramic ingredient slurry is charged into the extruder, and is continuously extruded through a metal mold die. The extruded honeycomb molded product is cut into equal lengths to obtain cut pieces of square columnar honeycomb molded products. Further, a predetermined amount of sealing paste is filled into an opening on one side of each cell of the cut piece to seal both end faces of each cut piece.

Subsequently, sintering temperature, sintering time and the like are set to a predetermined condition to perform main sintering, and the honeycomb molded product cut piece and the plug 14 are completely sintered. To have the average pore diameter be 6 μm to 100 μm, and the porosity be 30% to 80%, the sintering temperature is set to 1400° C. to 2300° C. in the present embodiment. The sintering time is set between 0.1 hour and 5 hours. The atmosphere within the furnace during sintering is inactive, and the pressure of the atmosphere is normal.

Next, after a base coating layer made of ceramic is formed on the outer surface of the honeycomb filter F1 if necessary, the sealing material layer forming paste is applied thereto. Then, 4 to 130 of such honeycomb filters F1 are used to adhere the outer surfaces of the honeycomb filters F1 with each other and integrate the honeycomb filters F1.

In the subsequent outer shape cutting process, unnecessary parts of the peripheral portion of the assembly 9 having a square cross section obtained through the filter adhering process is ground and removed, the ceramic sealing material layer forming paste is applied to the peripheral portion to form an outer ceramic sealing material layer. This adjusts the outer shape. As a result, the ceramic filter assembly 9 having a substantially elliptical cross section is manufactured.

The outer ceramic sealing material layer will now be described. The thickness of a normal outer ceramic sealing material layer is uniform. In the present embodiment, as shown in FIG. 10(b), in the outer ceramic sealing material layer, the portion located along an extention of the major axis of the assembly 9 is denoted by 15c, the portion located along an extension of the minor axis of the assembly 9 is defined as 15d, and the thickness of portion 15c is denoted by H1, and the thickness of portion 15d is denoted by H2.

Depending on the type of assembly 9, the cell 12, or recesses, are exposed from the peripheral surface of the assembly 9 by the grinding process. In this case, the thickness of the ceramic sealing material layer is defined as the distance from a curve surface connecting the cell walls 13a and 13b of the exposed cells 12.

The ceramic sealing material layer forming paste is applied so that the thickness of the middle part between the portion 15c and the portion 15d changes gradually. The adjustment of the thickness of the ceramic sealing material layer is possible by performing machining after the application of the paste. Alternatively, the sealing material layer may be formed by injecting and drying the ceramic sealing material in the mold so that the sealing material layer has such thickness.

The ratio H2/H1 is preferably 0.95 or less. If the ratio H2/H1 is greater than 0.95, the filter in the long side direction easily cools, and uniform temperature rise of the assembly 9 becomes difficult. This causes soot to remain and cracks tend to occur.

The ratio H2/H1 is preferably 0.06 or greater. If the ratio H2/H1 is less than 0.06, the release of heat reverses between the short side direction and the long side direction. Thus, a uniform temperature rise of the assembly 9 becomes difficult.

The assembly 9 is wrapped by the thermal insulation material 10 (refer to FIG. 1 and FIG. 10(c)) and is accommodated in the casing 8. The thermal insulation material normally has a uniform thickness. In the present embodiment, the thickness of the thermal insulation material differs between portion 16a, which is located along an extension of the major axis of the assembly 9, and portion 16b, which is located along an extension of the minor axis of the assembly 9. In the following description, the thickness of portion 16a is denoted by I1, and the thickness of portion 16b is denoted by I2.

The ratio of I2/I1 is preferably 0.91 or less. If the ratio I2/I1 is greater than 0.91, the filters F1 near the outer side in the direction of the long side cools easily, uniform temperature rise of the assembly 9 becomes difficult, and soot remains thereby causing cracks to easily occur. It is preferable that the ratio I2/I1 be 0.30 or greater. If the ratio I2/I1 is less than 0.30, the heat release reverses between the short side direction and the long side direction and thus uniform temperature rise of the assembly 9 becomes difficult.

For the thermal insulation material 10, a mat formed from typical ceramic fibers, alumina fibers, and alumina silicate fibers may be used.

The fine particle trapping effect of the ceramic filter assembly 9 will now be briefly described.

Exhaust gas, which is supplied from the upstream side end face 9α of the ceramic filter assembly 9, flows into the cells 12 that are opened in the upstream side end face 9α. The exhaust gas passes through the cell walls 13a and 13b and reaches the interior of the cells 12 opened in the adjacent downstream end face 9β. The gas that passes through the walls 13a and 13b flows out from the downstream side end face 9β of the honeycomb filter F1 through the opening of the corresponding cells 12. The fine particles contained in the exhaust gas does not pass through the cell walls 13a and 13b and become trapped in the walls 13a and 13b. And, the gas from which the fine particles are removed (purified gas) is discharged from the downstream side end face 9β of the honeycomb filter F1. The purified gas passes through the second exhaust pipe 7 and is released into the atmosphere. The trapped fine particles are ignited and burned by the action of the above mentioned catalyst when the internal temperature of the assembly 9 reaches a predetermined temperature.

A thermal shock test conducted on the filter will now be described.

[Test 1]

First, 51.5% by weight of α-silicon carbide powder having an average particle diameter of 10 μm and 22% by weight of β-silicon carbide powder having an average particle diameter of 0.5 μm were wet mixed, and 6.5% by weight of organic binder (methyl cellulose) and 20% by weight of water were added to the obtained mixture and kneaded. Next, a small amount of plasticizer and lubricant were added to the kneaded mixture and was further kneaded, and was then extruded with a different metal mold die to obtain a honeycomb molded product.

Subsequently, after drying the molded product with a microwave drier, the cells (through holes) of the molded product were sealed with the sealing paste made of a porous silicon carbide sintered material. Then, the drier was used again to dry the sealing paste. Subsequently, the dried body was degreased at 400° C., and then baked for about 3 hours at 2200° C. under an argon atmosphere of normal pressure. As a result, a honeycomb filter F1 made of porous silicon carbide sintered body was obtained. In accordance with this method, a filter having a dimension as shown in table 1 was prepared. The length of each filter was unified to 150 mm.

Each filter was gradually heated to 600° C. or 800° C. in an electric furnace, and was held for 3 hours at a target temperature. Thereafter, the filter was placed under a normal temperature of 20° C. to apply thermal shock to the filter. The occurrence of cracks is shown in table 1.

With the thermal shock of 600° C. and 800° C., cracks occurred when the ratio B1/B2 was 3.04 or greater. It was found that a filter can sufficiently withstand a thermal shock of about 800° C., at which it may be used, when the ratio B1/B2 is 3.0 or less.

[Test 2]

First, 51.5% by weight of silicon carbide powder having an average particle diameter 10 μm, 12% by weight of silicon carbide powder having an average particle diameter of 0.5 μm, and 10% by weight of metal silicon having an average particle diameter of 0.5 μm were wet mixed, and 6.5% by weight and 20% by weight of the organic binder (methyl cellulose) and water were each added to the obtained mixture and kneaded. Next, a small amount of plasticizer and lubricant were added to the kneaded mixture and was further kneaded, and was then extruded with a different metal mold die to obtain a honeycomb molded product.

Subsequently, after drying the molded product with a microwave drier, the cells (through holes) of the molded product were sealed with the sealing paste made of a porous silicon carbide sintered material. The drier was used again to dry the sealing paste. Subsequently, the dried body was degreased at 400° C., and then baked for about 3 hours at 1500° C. under an argon atmosphere of normal pressure. As a result, a honeycomb filter F1 made of porous silicon carbide-metal silicon sintered material was obtained. In accordance with this method, filters having the dimensions shown in table 2 were prepared. The length of each filter was unified to 150 mm. In the same manner as test 1, a thermal shock test was conducted. As shown in table 2, with a thermal shock of 600° C., cracks occurred when the ratio B1/B2 was 3.09 or greater. In the thermal shock of 800° C., cracks occurred when the ratio B1/B2 was 3.04 or greater. It was found that a filter can sufficiently withstand a thermal shock of about 800° C., at which it is used, when the ratio B1/B2 is 3.0 or less.

[Test 3]

In test 3, filters were manufactured through the same procedure as in test 1. However, the inner diameter of the cells (through holes) was changed. The result of the dimensions and the thermal shock test is shown in table 3. It is apparent from the result that with a thermal shock of 600° C. and 800° C., cracks occurred when the ratio C1/C2 was 3.07 or greater. It was found that a filter can sufficiently withstand a thermal shock of about 800° C., at which it is used, when the ratio C1/C2 is equal 3.0 or less.

[Test 4]

In test 4, filters were manufactured through the same procedure as in test 2. However, the inner diameter of the cells (through holes) was changed. The result of the dimensions and the thermal shock test is shown in table 4. It is apparent from the result that with a thermal shock of 600° C., cracks occurred when the ratio C1/C2 was 3.20 or greater, and with a thermal shock of 800° C., cracks occurred when the ratio C1/C2 was 3.07 or greater. It was found that a filter can sufficiently withstand a thermal shock of about 800° C., at which it is used, when the ratio C1/C2 is 3.0 or less.

[Test 5]

In test 5, filters were manufactured through the same procedure as in test 1. However, the wall thickness was changed. The result of the dimensions and the thermal shock test is shown in table 5. It is apparent from the result that with thermal shock of 600° C. and 800° C., cracks occurred when the ratio D1/D2 was 3.03 or greater. It was found that a filter can sufficiently withstand the thermal shock of about 800° C., at which it is used, when the ratio D1/D2 is 3.0 or less.

[Test 6]

In test 6, filters were manufactured through the same procedure as in test 2. However, the wall thickness was changed. The dimensions and the results of the thermal shock are shown in table 6. It is apparent from the results that with thermal shock of 600° C., cracks occurred when the ratio D1/D2 was 3.08 or greater, and with thermal shock of 800° C., cracks occurred when the ratio D1/D2 was 3.03 or greater. It was found that a filter can sufficiently withstand a thermal shock of about 800° C., at which it is used, when the ratio D1/D2 is 3.0 or less.

EXAMPLES AND COMPARATIVE EXAMPLES

Example 1-1

First, 51.5% by weight of α-silicon carbide powder and 22% by weight of β-silicon carbide powder were wet mixed, and 6.5% by weight of an organic binder (methyl cellulose) and 20% by weight of water were added to the obtained mixture and kneaded. Next, a small amount of plasticizer and lubricant were added to the kneaded mixture and was further kneaded, and was then extruded with a different metal mold die to obtain a honeycomb molded product.

Subsequently, after drying the molded product with a microwave drier, the cells (through holes) 12 of the molded product were sealed with the sealing paste made of a porous silicon carbide sintered material. Then, the drier was used again to dry the sealing paste. Subsequently, the dried body was degreased at 400° C., and was then baked for about 3 hours at 2200° C. under an argon atmosphere at normal pressure. As a result, honeycomb filters F1 made from the porous silicon carbide sintered material were obtained. In each honeycomb filter, the long side B1 was set to 66.9 mm, the short side B2 was set to 32.7 mm, the length L was set to 150 mm, both lengths of the long side and the short side of the cells 12 were set to 1.5 mm, and both thicknesses D1 and D2 of the cell walls 13a and 13b were set to 0.3 mm (in the same manner as in test example 1.2).

Then, 23.3% by weight of ceramic fibers, 30.2% by weight of silicon carbide powder having an average particle diameter of 0.3 μm, 7% by weight of silica sol serving as the inorganic binder, 0.5% by weight of carboxymethyl cellulose serving as the inorganic binder, and 39% by weight of water were mixed and kneaded. By adjusting such kneaded mixture to an appropriate viscosity, the paste used for forming the sealing material layers 15a, 15b, and 15c was prepared. The ceramic fibers were alumina silicate ceramic fibers having a shot content of 3% with fiber lengths of 0.1 mm to 100 mm, and the conversion amount of silica sol in terms of $SiO_2$ amount was 30%.

Figure 6:
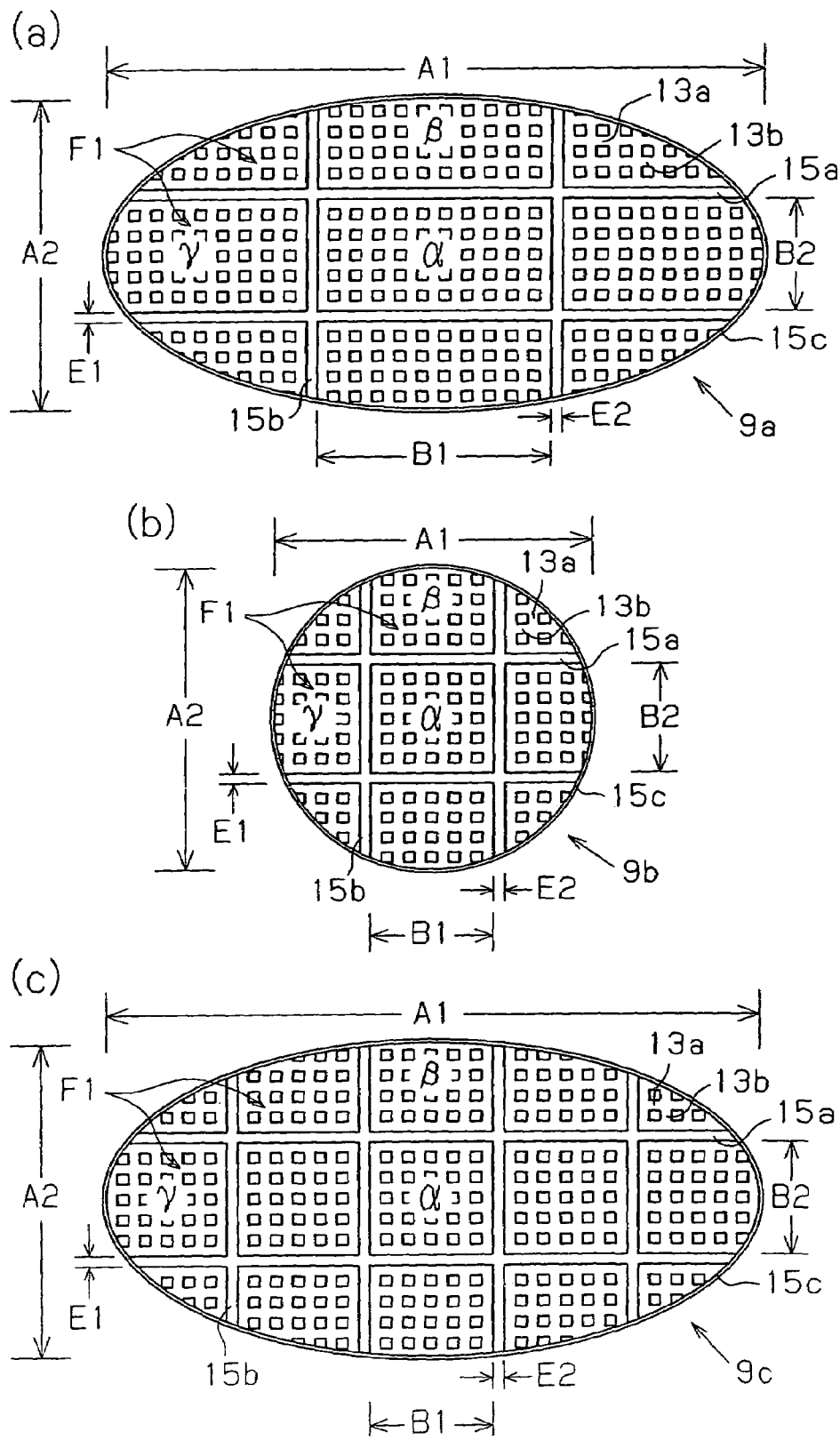
FIG. 6(a) is a side view of the filter assembly formed from a honeycomb filter having a rectangular cross section.
FIGS. 6(b) and 6(c) are side views of the filter assembly formed from a honeycomb filter having a square cross section.

The sealing material layer forming paste was then uniformly applied to the outer surfaces of the honeycomb filters F1 to form the sealing material layers 15a and 15b with a thickness of 1.0 mm. Nine honeycomb filters F1 were arranged in the same direction in three rows and three columns and dried for 1 hour at 100° C. with the outer surfaces adhered to each other. The sealing material layers 15a and 15b were then cured, and the nine honeycomb filters F1 were integrated. The outer shape cutting process was performed to form an ellipse with the cross sectional shape of the assembly of the integrated nine honeycomb filters F1. The major axis A1 of the ellipse was 160 mm, the minor axis A2 was 80 mm, and the ratio A1/A2 was 2. The sealing material layer 15c having a thickness of 1.5 mm was applied to the peripheral portion of the assembly and the outer shape was cut and trimmed to manufacture a ceramic filter assembly 9a having a substantially elliptical cross section, as shown in FIG. 6(a).

The thermal insulation material 10 was uniformly wrapped around the assembly 9a that was obtained as described above to a thickness of 10 mm. The assembly 9a was accommodated in the casing 8, and the exhaust gas was actually supplied. As shown in FIG. 3(a), a thermocouple was embedded at one location P(Temp.) at substantially the center of the honeycomb filter F1, and the temperatures Tα, Tβ, and Tγ of the honeycomb filter F1 at three locations denoted by α, β, and γ in FIG. 6(a) were measured with time. Tα is the temperature at the center of a filter, Tβ is the temperature at a position 5 mm from the outermost surface of the filter in the direction of the minor axis, and Tγ is the temperature 5 mm from the outermost surface of the filter in the direction of the major axis. The maximum temperature differences ΔT (° C.) between the positions α, β, and γ were also measured. The black arrow in FIG. 3 shows the direction of the flow of the exhaust gas.

After repeating the reproduction test for a number of times (10 times), the assembly 9 was taken out and each honeycomb filter F1 was visually observed to study the residual soot and the occurrence of cracks. As a result, in example 1, the maximum temperature difference ΔT (° C.) was approximately 50° C., the value of which is extremely small. Further, no residual soot was present in any of the honeycomb filters F1, and the occurrence of cracks was not confirmed.

Comparative Examples 1-1 to 1-2

In comparative examples 1-1 and 1-2, the assembly 9 was manufactured basically in the same manner as in example 1-1. However, in comparative example 1-1, the long side B1 of each honeycomb filter F1 was changed to 32.7 mm, the short side B2 was changed to 32.7 mm, and the length L was changed to 150 mm (in the same manner as in test reference example 1.1 (table 1)). Nine filters were arranged in three rows and three columns with the long side B1 parallel to each other to manufacture the assembly 9b with a circular cross section of diameter 80 mm, as shown in FIG. 6(b). In comparative example 1-2, the long side B1 of each honeycomb filter F1 was changed to 32.7 mm, the short side B2 was changed to 32.7 mm, and the length L was changed to 150 mm (in the same manner as in test reference example 1.1 (table 1). Fifteen filters were arranged in three rows and five columns with the long side B1 parallel to each other to manufacture assembly 9c with a substantially elliptical cross section (160 mm×80 mm), as shown in FIG. 6(c).

The same test as in example 1-1 was performed on the two types of assemblies 9b and 9c. As a result, in comparative example 1-1, the maximum temperature difference ΔT(° C.) was about 50° C., which value is an extremely small value. No residual soot was present in any of the honeycomb filters F1, the occurrence of cracks was not confirmed.

However, in comparative example 1-2, ΔT was approximately 100° C., the value of which is very large. Further, residual soot was present and the occurrence of cracks was confirmed in the honeycomb filter F1 located at position γ.

In the same manner, a similar test was performed on the silicon carbide-metal silicon filter with respect to the maximum temperature difference $\Delta T(°C.)$ and the occurrence of cracks.

More specifically, in example 1-2, the assembly in which the filters of test example 2.2 (table 2) were assembled as shown in FIG. 6(a) was used. In comparative example 1-3, the assembly in which the filters of test comparative example 2.1 were assembled as shown in FIG. 6(b) was used. In comparative example 1-4, the assembly in which the filters of test comparative example 2.1 were assembled as shown in FIG. 6(c) was used.

As shown in table 7, the maximum temperature difference $\Delta T(°C.)$ was 60° C. in example 1-2, whereas in comparative example 1-4, the temperature difference was 110° C. or greater, and cracks were conformed in the honeycomb filter at position γ.

Examples 2-1 to 2-4

Figure 7:
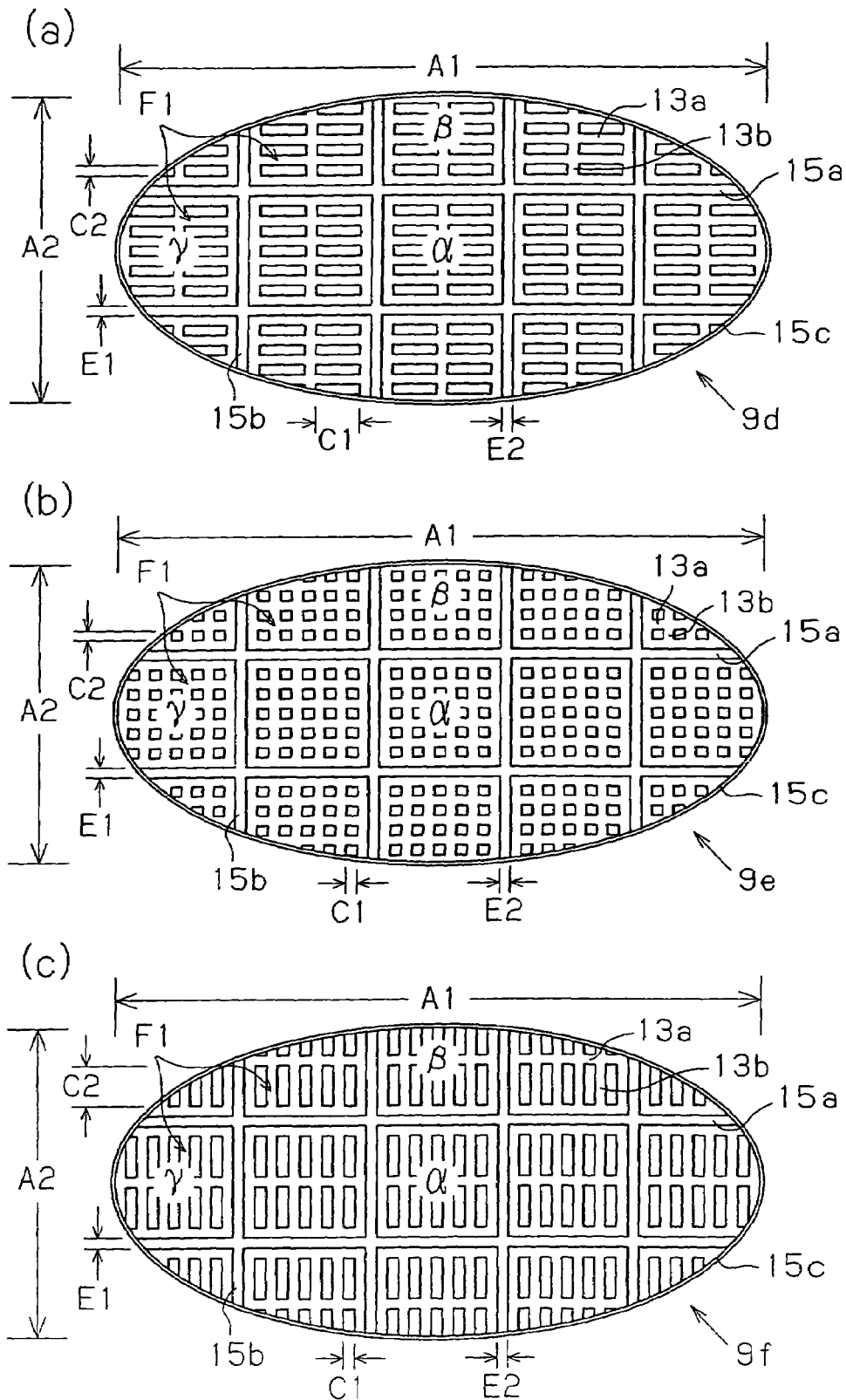
FIGS. 7(a), 7(b), and 7(c) are side views of the filter assembly formed from a honeycomb filter having cells of different shapes.

In examples 2-1 to 2-4, the assembly 9 was manufactured basically in the same manner as in comparative examples 1-3. In example 2-1, in the cells 12 of each honeycomb filter F1, C1 was set to 1.7 mm and C2 was set to 1.5 mm. Therefore, C1/C2=1.13. Five honeycomb filters F1 were arranged parallel to the long side of the cell 12, and three honeycomb filters F1 were arranged perpendicular to the long side of the cells 12 to assemble an assembly of fifteen honeycomb filters F1. The outer shape cutting process was performed to manufacture an assembly 9d (160 mm×80 mm×150 mm) having a substantially elliptical cross section, as shown in FIG. 7(a). As shown in table 8, examples 2-2 to 2-4 differ from example 2-1 only in the dimensions of the cells 12.

Comparative Examples 2-1 to 2-4

The assembly 9 was also manufactured basically in the same manner as in example 2-1 in comparative examples 2-1 to 2-4. However, in comparative example 2-1, the dimension C1 of the cell 12 was 1.5 mm, C2 was 1.5 mm, and C1/C2=1. After assembling the honeycomb filters F1 in three rows and five columns, the outer shape cutting was performed to manufacture an assembly 9e (160 mm×80 mm×150 mm) having a substantially elliptical cross section, as shown in FIG. 7(b). In comparative example 2-2, the dimension C1 of the cell 12 was 1.5 mm, C2 was 1.7 mm, and C1/C2=0.88. Fifteen honeycomb filters F1 were assembled by arranging five sets of the filters F1 parallel to the 1.5 mm side with three filters F1 arranged vertically in each set. The outer shape cutting was performed to manufacture assembly 9f (160 mm×80 mm×150 mm) having a substantially elliptical cross section, as shown in FIG. 7(c). The comparative example 2-3 was manufactured in the same manner as in comparative example 2-2, and comparative example 2-4 was manufactured in the same manner as in example 2-1.

With respect to the assemblies of examples 2-1 to 2-4, and comparative examples 2-1 to 2-4, the maximum temperature difference $\Delta T$ and the occurrence of cracks were studied. As a result, the maximum temperature difference $\Delta T$ (° C.) was 93° C. or less in examples 2-1 to 2-4, and no residual soot was present in any of the honeycomb filters F1, and the occurrence of cracks was not confirmed.

However, in comparative example 2-1, comparative example 2-2, and comparative example 2-3, the maximum temperature difference $\Delta T$ (° C.) was greater than or equal to 100° C., the value of which is very large. Residual soot was present and the occurrence of cracks was confirmed in the honeycomb filter F1 at position γ. Further, in comparative example 2-4, the temperature difference was low but cracks occurred.

Examples 2-5 to 2-8, Comparative Examples 2-5 to 2-8

In the same manner, the maximum temperature difference $\Delta T$ (° C.) and the occurrence of cracks in the silicon carbide-metal silicon filter were studied.

More specifically, in examples 2-5 to 2-8, the filters of test examples 4.1 to 4.4 (table 4) were used in a state assembled as shown in the assembly of FIG. 7(a). In comparative example 2-5, the filters of the test reference example 4.1 were used in a state assembled as shown in FIG. 7(b). In comparative examples 2-6, 2-7, the filters of test examples 4.1 and 4.2, were used in a state assembled as shown in the assembly of FIG. 7(c). In comparative example 2-8, the filters of test comparative example 4.1 were used in a state assembled as shown in the assembly of FIG. 7(a).

The maximum temperature difference $\Delta T$ (° C.) of examples 2-5 to 2-8 was 110° C. or less, whereas the maximum temperature difference $\Delta T$ (° C.) of comparative examples 2-5 to 2-8 was 110° C. or greater, and cracks occurred in the honeycomb filter located at position γ.

The results are shown in table 8.

Examples 3-1 to 3-4

Figure 8:
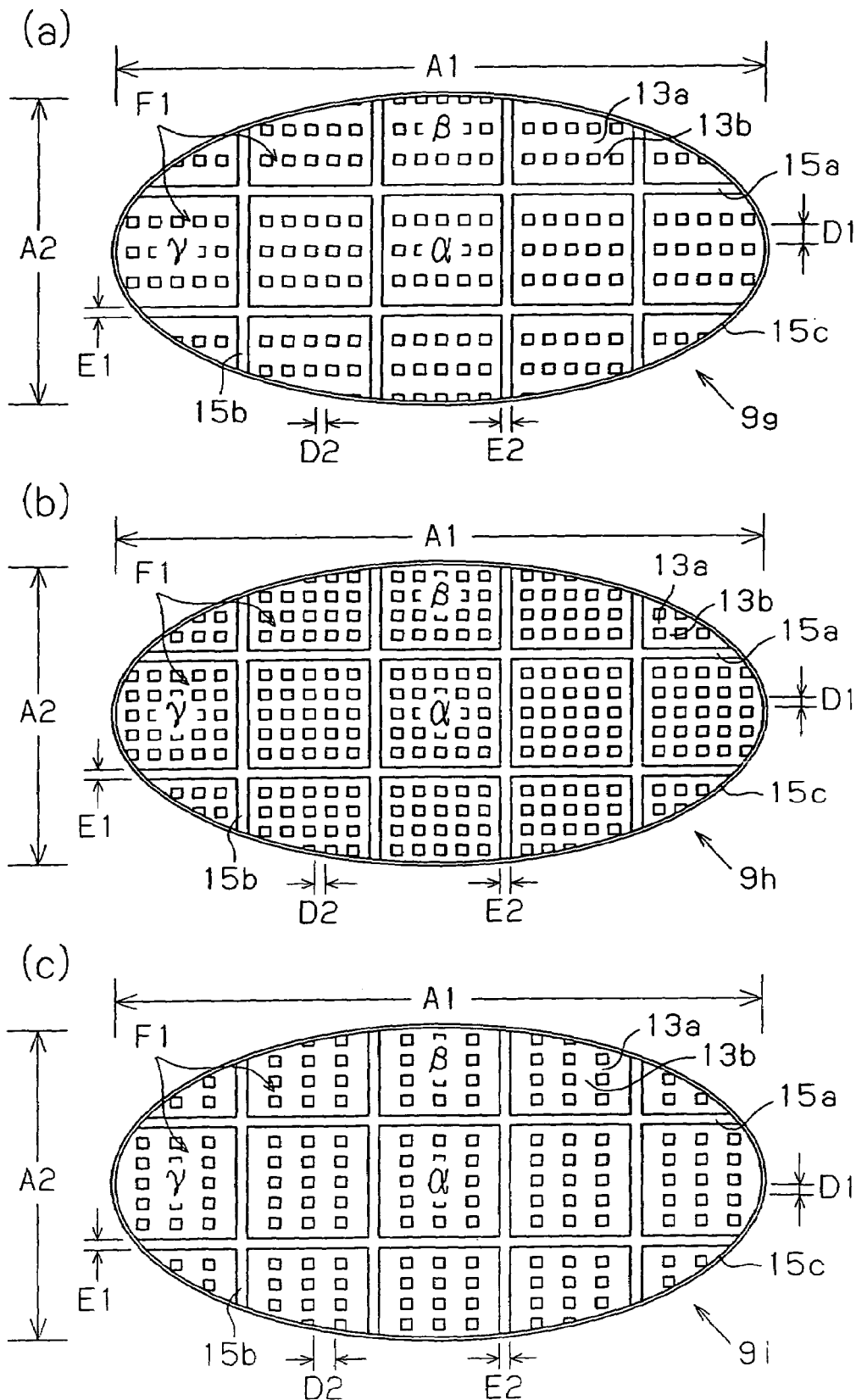
FIGS. 8(a), 8(b), and 8(c) are side views of a filter assembly formed from a honeycomb filter having walls of different thicknesses.

In examples 3-1 to 3-4, the assembly 9 was manufactured basically in the same manner as in comparative example 1-3. However, in example 3-1, the dimension D1 of the cell wall 13 of each honeycomb filter F1 was changed to 0.4 mm, and D2 was changed to 0.35 mm. Therefore, D1/D2=1.14. Five honeycomb filters F1 were arranged parallel to D1 and three honeycomb filters F1 were arranged perpendicular to D1 to form an assembly of fifteen honeycomb filters F1. The outer shape cutting process was performed to manufacture an assembly 9g (160 mm×80 mm×150 mm) having a substantially elliptical cross section, as shown in FIG. 8(a). In the same manner, the assembly of examples 3-2 to 3-4 were manufactured.

Comparative Examples 3-4l to 3-4

The assembly was also manufactured basically in the same way as in example 3-1 in comparative examples 3-1 to 3-4. However, in comparative example 3-1, the dimension D1 was changed to 1.5 mm, and D2 was changed to 1.5 mm. Therefore, ratio D1/D2=1. After assembling the honeycomb filters F1 in three rows and five columns, the outer shape cutting process was performed to manufacture an assembly 9h (160 mm×80 mm×150 mm) having a substantially elliptical cross section, as shown in FIG. 8(b). In comparative example 3-2, the dimension D1 was 0.35 mm, and D2 was 0.4 mm. Therefore, ratio D1/D2=0.88. Five of such honeycomb filters F1 were arranged parallel to D2 and three honeycomb filters F1 were arranged perpendicular to D2 to form an assembly of fifteen honeycomb filters F1. The outer shape cutting process was performed to manufacture an assembly 9i (160 mm×80 mm×150 mm) having a substantially elliptical cross section, as shown in FIG. 8(c). The comparative example 3-3 was manufactured in the same manner as in comparative example 3-2, and comparative example 3-4 was manufactured in the same manner as in example 3-1.

With respect to the assembly of examples 3-1 to 3-4, and comparative examples 3-1 to 3-4, the maximum temperature difference ΔT and the occurrence of cracks were studied. As a result, as shown in table 9, the maximum temperature difference ΔT (° C.) was 91° C. or less in examples 3-1 to 3-4. Further, no residual soot was present and the occurrence of cracks was not recognized in any of the honeycomb filters F1.

However, in comparative example 3-1, comparative example 3-2, and comparative example 3-3, the maximum temperature difference ΔT (° C.) was greater than or equal to approximately 95° C., the value of which is very large. Further, residual soot was present and the occurrence of cracks was confirmed in the honeycomb filter F1 at position γ. Further, in comparative example 3-4, the temperature difference was low but cracks occurred.

Examples 3-5 to 3-8, Comparative Examples 3-5 to 3-8

In the same manner, similar tests were performed on a silicon carbide-metal silicon filter.

More specifically, in examples 3-5 to 3-8, an assembly formed by arranging the filters of test examples 6.1 to 6.4 (table 6), as shown in FIG. 8(a), was used. In comparative example 3-5, an assembly formed by arranging the filters of the test reference example 6.3, as shown in FIG. 8(b), was used. In comparative example 3-6 and comparative example 3-7, assemblies formed by arranging the filters of test examples 6.1 and 6.4 (table 6), respectively, as shown in FIG. 8(c), were used. In comparative example 3-8, an assembly formed by arranging the filters of test comparative example 6.1, as shown in FIG. 8(a) was used.

As shown in table 9, the maximum temperature difference of examples 3-5 to 3-8 was 101° C. or less. In comparison, in comparative examples 3-5, 3-6, and 3-7, the maximum temperature difference was 105° C. or greater, and cracks occurred in the honeycomb filter located at position γ. In comparative example 3-8, the temperature difference was low, but cracks occurred.

Examples 4-1 to 4-5, Comparative Examples 4-1 to 4-3

In examples 4-1 to 4-5, an assembly 9 was manufactured basically in the same manner as in comparative example 1-2 using the filters of the test reference example 1.1 (table 1). In example 4-1, however, the thickness E1 of the sealing material layer 15a was 1.05 mm, the thickness E2 of the sealing material layer 15b was 1 mm, and the ratio E1/E2=1.05 (refer to FIG. 9(a)).

Similarly, example 4-2 to example 4-5 and comparative example 4-3 were manufactured in accordance with the description of table 10.

Figure 9:
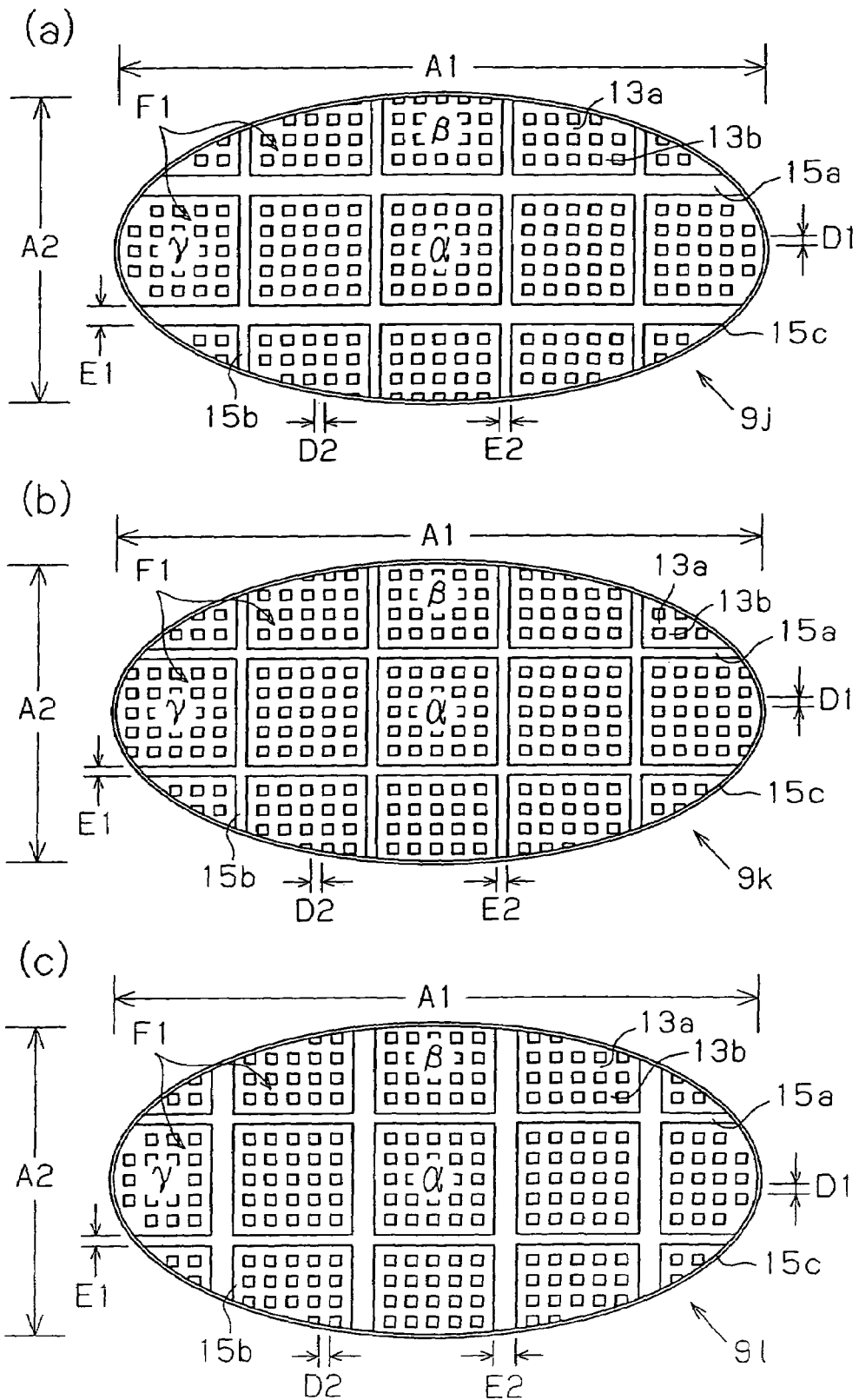
FIGS. 9(a), 9(b), and 9(c) are side views of the filter assembly integrated with a sealing material layer of different thickness.

In comparative example 4-1, the thickness E1 of the sealing material layer 15a was 1 mm, the thickness E2 of the sealing material layer 15b was 1 mm, and E1/E2=1 (refer to FIG. 9(b)).

In comparative example 4-2, the assembly was manufactured basically in the same manner as in comparative example 1-2 using the filters of test reference example 1.1. In example 4-2, however, the thickness E1 of the sealing material layer 15a was 1 mm, the thickness E2 of the sealing material layer 15b was 2 mm, and the ratio E1/E2=0.5 (refer to FIG. 9(c).).

With respect to the assemblies of examples 4-1 to 4-5 and comparative examples 4-1 to 4-3, the maximum temperature difference Tβ-Tα and the occurrence of cracks were studied. As a result, as shown in table 10, the maximum temperature difference Tβ-Tα was 75° C. or less in examples 4-1 to 4-5, and no residual soot was present and the occurrence of cracks was not confirmed in any of the honeycomb filters F1.

However, in comparative example 4-1 and comparative example 4-2, the maximum temperature difference Tβ-Tα was greater than or equal to 80° C., the value of which is very large, and residual soot was present and the occurrence of cracks was confirmed in the honeycomb filter F1 located at position γ. Further, in comparative example 4-3, the temperature difference was reversed and cracks occurred at position β.

Examples 4-6 to 4-10, Comparative Examples 4-4 to 4-6

In the same manner, similar tests were performed on a silicon carbide-metal silicon filter.

In example 4-6 to example 4-10, an assembly was manufactured basically in the same manner as in comparative example 1-2 using the filter of the test reference example 2.1. In example 4-6, however, the thickness of the sealing material layer parallel to the long side of the assembly 9 was E1 (1.05 mm), and the thickness of the sealing material layer parallel to the short side was E2 (1 mm), and thus E1/E2=1.05.

Similarly, example 4-6 to example 4-10 and comparative example 4-6 were manufactured in accordance with table 10.

In the assembly of comparative example 4-4, the thickness E1 of the sealing material layer 15a was 1 mm, the thickness E2 of the sealing material layer 15b was 1 mm and thus E1/E2=1 (refer to FIG. 9(b)).

In comparative example 4-5, the assembly was manufactured basically in the same manner as in comparative example 1-2 using the filter of test reference example 2.1. In example 4-5, however, the thickness E1 of the sealing material layer 15a was 1 mm, the thickness E2 of the sealing material layer 15b was 2 mm, and the ratio E1/E2=0.5 (refer to FIG. 9(c)).

With respect to the assembly of examples 4-6 to 4-10 and comparative examples 4-4 to 4-6, the maximum temperature difference Tβ-Tα and the occurrence of cracks were studied. As a result, as shown in table 10, the maximum temperature difference Tβ-Tα was 80° C. or less in the examples, and no residual soot was present and the occurrence of cracks was not confirmed in any of the honeycomb filters F1.

However, in comparative example 4-4 and comparative example 4-5, the maximum temperature difference Tβ-Tα was greater than or equal to 100° C., the value of which is very large, residual soot was present and the occurrence of cracks was confirmed in the honeycomb filter F1 located at position γ. Further, in comparative example 4-6, the temperature difference was reversed and cracks occurred at position β.

Examples 5-1 to 5-4, Comparative Examples 5-1 to 5-3

In examples 5-1 to 5-4, an assembly was manufactured basically in the same manner as in comparative example 1-2 using the filter of test reference example 1.1 (table 1). In example 5-1, however, the thermal conductivity G1 of the sealing material layer 15a was 0.2 W/m·K, the thermal conductivity G2 of the sealing material layer 15b was 0.3 W/m·K, and G1/G2=0.67 (refer to FIG. 10(a)).

Similarly, in example 5-2 to example 5-4 and comparative examples 5-1 to 5-3, assemblies were manufactured by adjusting G1 in accordance with the description of table 11.

In comparative example 5-1, G1 and G2 were the same and thus G1/G2=1.

With respect to the assemblies of examples 5-1 to 5-4 and comparative examples 5-1 to 5-3, the maximum temperature difference Tβ-Tα and the occurrence of cracks were studied. As a result, as shown in table 11, the maximum temperature difference Tβ-Tα was 76° C. or less in examples 5-1 to 5-4, and no residual soot was present and the occurrence of cracks was not confirmed in any of the honeycomb filters F1.

However, in comparative example 5-1 and comparative example 5-2, the maximum temperature difference Tβ-Tα was greater than or equal to 80° C., the value of which is very large, and residual soot was present and the occurrence of cracks were confirmed in the honeycomb filter F1 located at position γ. Further, in comparative example 5-3, the temperature difference was reversed and cracks occurred at position β.

Examples 5-5 to 5-8, Comparative Examples 5-4 to 5-6

In the same manner, similar tests were performed on a silicon carbide-metal silicon filter.

In example 5-5 to example 5-8 and comparative example 5-4 to comparative example 5-6, an assembly was basically manufactured in accordance with the description of table 11 using the filter of test reference example 2.1.

In examples 5-5 to 5-8, the temperature difference Tβ-Tα was 80° C. or less, and no residual soot was present and the occurrence of cracks was not confirmed in any of the honeycomb filters F1.

However, in comparative example 5-4 and comparative example 5-5, the maximum temperature difference Tβ-Tα was greater than or equal to 80° C., the value of which is very large, and residual soot was present and the occurrence of cracks was confirmed in the honeycomb filter F1 located at position γ. Further, in comparative example 5-6, the temperature difference was reversed and cracks occurred at position β.

The results are shown in table 11.

Example 6-1 to 6-4, Comparative Example 6-1 to 6-3

In examples 6-1 to 6-4, an assembly was manufactured basically in the same manner as in comparative example 1-2 using the filter of test reference example 1.1. In example 6-1, however, the thickness Hi of the outer sealing material layer 15c was 1.6 mm, thickness H2 of the outer sealing material layer 15d was 1.5 mm, and thus H2/H1=0.94 (refer to FIG. 10(b)). The thickness between the outer sealing material layers 15c and 15d was adjusted so that the thicknesses of the outer sealing material layers were gradually changed. Therefore, the thicknesses H1 and H2 were either the maximum thickness or the minimum thickness of the outer sealing material layer.

Similarly, the assembly of example 6-2 to example 6-4, and comparative examples 6-1 to 6-3 were manufactured by adjusting the thickness of H2 in accordance with the description of table 12.

In comparative example 6-1, H2/H1=1.

As shown in table 12, in examples 6-1 to 6-4, the maximum temperature difference Tβ-Tα was 73° C. or less and no residual soot was present and the occurrence of cracks was not confirmed in any of the honeycomb filters F1.

However, in comparative example 6-1 and comparative example 6-2, the maximum temperature-difference Tβ-Tα was 80° C. or greater, the value of which is very large, and residual soot was present and the occurrence of cracks was confirmed in the honeycomb filter F1 located at position γ. Further, in comparative example 6-3, the temperature difference was reversed and cracks occurred at position β.

Examples 6-5 to 6-8, Comparative Examples 6-4 to 6-6

In the same manner, similar tests were performed on a silicon carbide-metal silicon filter.

Example 6-5 to example 6-8 and comparative example 6-4 to comparative example 6-6 were basically manufactured in accordance with the description of table 12 using the filter of the test reference example 2.1.

As shown in table 12, in examples 6-5 to 6-8, the temperature difference Tβ-Tα was 80° C. or less. Further, no residual soot was present and the occurrence of cracks was not confirmed in any of the honeycomb filters F1.

However, in comparative example 6-4 and comparative example 6-5, the maximum temperature difference Tβ-Tα was greater than or equal to 83° C., the value of which is very large. Further, residual soot was present and the occurrence of cracks was confirmed in the honeycomb filter F1 located at position γ. Further, in comparative example 6-6, the temperature difference was reversed and cracks occurred at the position of β.

Examples 7-1 to 7-3, Comparative Examples 7-1 to 7-3

In examples 7-1 to 7-3, an assembly was manufactured basically in the same manner as in comparative example 1-2 using the filter of test reference example 1.1. In example 7-1, however, the thickness I1 of portion 16a of the outer thermal insulation material (mat made of alumina fiber) was 10 mm, the thickness I2 of portion 16b was 11 mm, and I2/I1=0.91 (refer to FIG. 10(c)). The thickness between portion 16a and 16b was adjusted so that the thickness of the thermal insulation material 10 was gradually changed. Therefore, the thicknesses H1 and H2 were either the maximum thickness or the minimum thickness of the thermal insulation material.

In the same manner, example 7-2 to example 7-3 and comparative example 7-3 were manufactured by adjusting the thickness of I2 in accordance with the description of table 13.

In comparative example 7-1, I1 and I2 had the same thickness as in H2/H1=1.

As shown in table 13, in examples 7-1 to 7-8, the maximum temperature difference Tβ-Tα was 73° C. or less. Further, no residual soot was present and the occurrence of cracks was not recognized in any of the honeycomb filters F1.

However, in comparative example 7-1 and comparative example 7-2, the maximum temperature difference Tβ-Tα was greater than or equal to 80° C., the value of which is very large. Further, the residual soot was present and the occurrence of cracks was confirmed in the honeycomb filter F1 located at position γ. Further, in comparative example 7-3, the temperature difference was reversed and cracks occurred at position β.

Examples 7-4 to 7-6, Comparative Examples 7-4 to 7-6

In the same manner, similar tests were performed on a silicon carbide-metal silicon filter.

Example 7-4 to example 7-6 and comparative example 7-4 to comparative example 7-6 were basically manufactured in accordance with the description of table 13 using the filter of test reference example 2.1.

The temperature difference Tβ-Tα was 80° C. or less in examples 7-4 to 7-6. Further, no residual soot was present and the occurrence of cracks was not confirmed in any of the honeycomb filters F1.

However, in comparative example 7-4 and comparative example 7-5, the maximum temperature difference Tβ-Tα was greater than or equal to 83° C., the value of which is very large. Further, residual soot was present and the occurrence of cracks was confirmed in the honeycomb filter F1 located at position γ. Further, in comparative example 7-6, the temperature difference was reversed and cracks occurred at position β.

The present embodiment has the advantages described below.

(1) The assembly 9 is manufactured by adhering a plurality of ceramic filters F1 so that the long sides of ceramic filters F1 having rectangular cross sections extend in the direction of the major axis of the assembly 9 and the short sides of the ceramic filters F1 extend in the direction of the minor axis of the assembly 9. Thus, in the major axis direction of the assembly 9, the number of ceramic sealing material layers 15b that may influence thermal conductivity is reduced. Therefore, the thermal conductivity in the major axis direction is higher than the thermal conductivity in the minor axis direction of the assembly 9 during use, and the filters F1 at the peripheral portion in the major axis direction are more easily heated. The residual soot is thus not present and cracks do not occur. Further, this may be achieved by changing the ceramic structure without changing the material of the ceramic filter thereby reducing costs.

Further, in such a method, when a hypothetical first straight line intersects the generally elliptical contour at two points in which the distance therebetween is maximum and a hypothetical second straight line orthogonal to the first straight line intersects the generally elliptical contour at two points in which the distance therebetween is minimum, the number of sealing material layers the second straight line of the assembly traverses is less than or equal to the number of sealing material layers and first straight line traverses. This reduces thermal conduction obstacles between filters.

(2) The rectangular cells 12 in the columnar honeycomb filters F1 produce a deviation of thermal conduction in the cross section of the filter. That is, the thermal conductivity in the long side direction of each cell is higher than the thermal conductivity in the short side direction of the cell. The assembly may be formed by arranging the cells so that their long sides are parallel to the major axis direction of and their short sides are parallel to the minor axis direction of the assembly. This results in the thermal conductivity in the major axis direction being greater than the thermal conductivity in the minor axis direction of the assembly during use. Further, the filters F1 at the peripheral portion in the major axis direction are more easily heated. Thus, residual soot is eliminated and cracks do not occur. Further, this is easily achieved by changing the ceramic structure without changing the material of the ceramic filter. Thus, costs are reduced.

(3) The cells 12 in the columnar honeycomb filter F1 are rectangular. By changing the thicknesses of cell walls that are orthogonal to each other, deviation of the thermal conductivity may be produced along the cross section of the filter. That is, the thermal conductivity in the direction in which the thick cell walls extend is higher than the thermal conductivity in the direction in which the thin cell walls extend. The filter assembly may be formed so that the major axis direction of the assembly is parallel to the direction in which the thick cell walls extend and the minor axis direction of the assembly is parallel to the direction in which the thin cell walls extend. This results in the thermal conductivity in the major axis direction being higher than the thermal conductivity in the minor axis direction of the assembly during use. Further, the filters F1 at the peripheral portion in the major axis direction are more easily heated. Thus, residual soot is eliminated and cracks do not occur. Further, this is easily achieved by changing the ceramic structure without changing the material of the ceramic filter. Thus, costs are reduced.

(4) By making the sealing material layers 15b, which are perpendicular to the major axis direction, relatively thin, the thermal conductivity in the major axis direction becomes higher than the thermal conductivity in the minor axis direction of the assembly 9. Thus, the filters F1 at the peripheral portion in the major axis direction are more easily heated, residual soot is eliminated, and cracks do not occur. Further, this is easily achieved by changing the ceramic structure without changing the material of the ceramic filter. Thus, costs are reduced.

(5) By changing the thermal conductivity G2 of the sealing material layers 15b, which are perpendicular to the major axis direction, to a high value, the thermal conductivity in the major axis direction becomes higher than in the minor axis direction of the assembly during use. Thus, the filters F1 at the peripheral portion in the major axis direction are more easily heated, residual soot is eliminated, and cracks do not occur. Further, this is easily achieved by changing the ceramic structure without changing the material of the ceramic filter. Thus, costs are reduced.

(6) In the ceramic filter assembly having a generally elliptical cross section, with regards to the outer sealing *material layer, which inhibits thermal conduction, the thickness Hi of the sealing material layer located along an extension of the major axis is greater than the thickness H2 of the sealing material layer located along an extension of the minor axis to suppress heat radiation from the peripheral portion in the major axis direction. This produces a high thermal insulation effect at the peripheral portion in the major axis direction. Thus, residual soot is eliminated, and cracks do not occur. Further, this is easily achieved by changing the ceramic structure without changing the material of the ceramic filter. Thus, costs are reduced.

(7) In the ceramic filter assembly 9 having a generally elliptical cross sectional shape, with regards to the thickness of the thermal insulation material 10 that inhibits thermal conduction, the thickness I1 of portion 16a located along an extension of the major axis is greater than the thickness I2 of portion 16b located along an extension of the minor axis. This suppresses heat radiation from the peripheral portion in the major axis direction. Thus, a high thermal insulation effect is produced at the peripheral portion in the major axis direction during use of the assembly. Thus, residual soot is eliminated, and cracks do not occur. Further, this is easily achieved by changing the ceramic structure without changing the material of the ceramic filter. Thus, costs are reduced.

(8) According to tests 1 and 2, when the cross sectional shape of a columnar honeycomb filter made of a porous ceramic sintered body is rectangular and the length of the long side is B1 and the length of the short side is B2, if the ratio B1/B2 is 3.0 or less, cracking due to thermal shock is less likely to occur. Thus, thermal shock resistance is considered to be about the same as when the cross sectional shape is square, and a filter unit necessary for a uniform temperature rise of the flat shape filter assembly 9 is provided. Since the sealing material and the like may be reduced, costs are also reduced.

(9) According to tests 3 and 4, when the cross sectional shape of a cell (through hole) of a columnar honeycomb filter made of porous ceramic sintered body is rectangular and the length of the long side is C1 and the length of the short side is C2, if the ratio C1/C2 is 3.0 or less, cracking due to thermal shock is less likely to occur. Thus, the thermal shock resistance is considered to be about the same as when the cross sectional shape of the cell (through hole) is square, and a filter unit necessary for a uniform temperature rise of the flat shaped filter assembly 9 is provided.

(10) According to tests 5 and 6, when there are two wall thicknesses for a cell of a columnar honeycomb filter made of porous ceramic sintered body and the dimension of the thick wall is D1 and the dimension of the thin wall is D2, if the ratio D1/D2 is 3.0 or less, cracking due to thermal shock is less likely to occur. Thus, the thermal shock resistance is considered to be about the same as when all of the wall thicknesses are the same, and a filter unit necessary for a uniform temperature rise of the oblong filter assembly 9 is provided.

The embodiment of the present invention may be modified in the following way.

The cross sectional shape of the honeycomb filters F1 may be rectangular, and the inner cells 12 may be rectangular in the same direction.

The cross sectional shape of the honeycomb filters F1 may be rectangular, and the thicker wall 13a of the inner cell walls 13a, 13b may be rectangular in the same direction as the long side.

Each cell of the honeycomb filter may be rectangular and the cell wall of the long side may be thicker than the cell wall of the short side.

The sealing material layer formed on the outer peripheral face of the assembly may be formed using two or more types of coating materials, which are applied to the outer surface, having different thermal conductivity.

The thermal insulation material 10 may be formed on the peripheral surface of the assembly using two or more types of thermal insulation materials having different thermal conductivity.

TABLE 1

| | side length (mm) | wall thickness (mm) | pitch | cell column | outer dimension (mm) | outer dimension (mm) | | thermal shock test | |
|---|---|---|---|---|---|---|---|---|---|
| | C1, C2 | D1, D2 | (mm) | number | B1 | B2 | B1/B2 | 600° C. | 800° C. |
| test reference example 1.1 | 1.5 | 0.3 | 1.8 | 18 | 32.7 | 32.7 | 1.00 | no cracks | no cracks |
| test reference example 1.2 | 1.5 | 0.3 | 1.8 | 19 | 34.5 | 32.7 | 1.06 | no cracks | no cracks |
| test example 1.1 | 1.5 | 0.3 | 1.8 | 20 | 36.3 | 32.7 | 1.11 | no cracks | no cracks |
| test example 1.2 | 1.5 | 0.3 | 1.8 | 37 | 66.9 | 32.7 | 2.05 | no cracks | no cracks |
| test example 1.3 | 1.5 | 0.3 | 1.8 | 54 | 97.5 | 32.7 | 2.98 | no cracks | no cracks |
| test comparative example 1.1 | 1.5 | 0.3 | 1.8 | 55 | 99.3 | 32.7 | 3.04 | cracks found | cracks found |
| test comparative example 1.2 | 1.5 | 0.3 | 1.8 | 56 | 101.1 | 32.7 | 3.09 | cracks found | cracks found |

TABLE 2

| | side length (mm) | wall thickness (mm) | pitch | cell column | outer dimension (mm) | outer dimension (mm) | | thermal shock test | |
|---|---|---|---|---|---|---|---|---|---|
| | C1, C2 | D1, D2 | (mm) | number | B1 | B2 | B1/B2 | 600° C. | 800° C. |
| test reference example 2.1 | 1.5 | 0.3 | 1.8 | 18 | 32.7 | 32.7 | 1.00 | no cracks | no cracks |
| test reference example 2.2 | 1.5 | 0.3 | 1.8 | 19 | 34.5 | 32.7 | 1.06 | no cracks | no cracks |
| test example 2.1 | 1.5 | 0.3 | 1.8 | 20 | 36.3 | 32.7 | 1.11 | no cracks | no cracks |
| test example 2.2 | 1.5 | 0.3 | 1.8 | 38 | 68.7 | 32.7 | 2.10 | no cracks | no cracks |
| test example 2.3 | 1.5 | 0.3 | 1.8 | 54 | 97.5 | 32.7 | 2.98 | no cracks | no cracks |
| test comparative example 2.1 | 1.5 | 0.3 | 1.8 | 55 | 99.3 | 32.7 | 3.04 | no cracks | cracks found |
| test comparative example 2.2 | 1.5 | 0.3 | 1.8 | 56 | 101.1 | 32.7 | 3.09 | cracks found | cracks found |

TABLE 3

| | side length (mm) | wall thickness (mm) | pitch | cell column | outer dimension (mm) | side length (mm) | side length (mm) | | thermal shock test | |
|---|---|---|---|---|---|---|---|---|---|---|
| | C1 | D1, D2 | (mm) | number | B1, B2 | C1 | C2 | C1/C2 | 600° C. | 800° C. |
| test reference example 3.1 | 1.5 | 0.3 | 1.8 | 18 | 32.7 | 1.5 | 1.5 | 1.00 | no cracks | no cracks |
| test reference example 3.2 | 1.6 | 0.3 | 1.9 | 17 | 32.6 | 1.6 | 1.5 | 1.07 | no cracks | no cracks |

TABLE 3-continued

| | side length (mm) | wall thickness (mm) | pitch | cell column | outer dimension (mm) | side length (mm) | side length (mm) | | thermal shock test | |
|---|---|---|---|---|---|---|---|---|---|---|
| | C1 | D1, D2 | (mm) | number | B1, B2 | C1 | C2 | C1/C2 | 600° C. | 800° C. |
| test example 3.1 | 1.7 | 0.3 | 2 | 16 | 32.3 | 1.7 | 1.5 | 1.13 | no cracks | no cracks |
| test example 3.2 | 2.25 | 0.3 | 2.55 | 13 | 33.45 | 2.25 | 1.5 | 1.50 | no cracks | no cracks |
| test example 3.3 | 3 | 0.3 | 3.3 | 10 | 33.3 | 3 | 1.5 | 2.00 | no cracks | no cracks |
| test example 3.4 | 4.4 | 0.3 | 4.7 | 7 | 33.2 | 4.4 | 1.5 | 2.93 | no cracks | no cracks |
| test comparative example 3.1 | 4.6 | 0.3 | 4.9 | 7 | 34.6 | 4.6 | 1.5 | 3.07 | cracks found | cracks found |
| test comparative example 3.2 | 4.8 | 0.3 | 5.1 | 6 | 30.9 | 4.8 | 1.5 | 3.20 | cracks found | cracks found |

TABLE 4

| | side length (mm) | wall thickness (mm) | pictch | cell column | outer dimension (mm) | side length (mm) | side length (mm) | | thermal shock test | |
|---|---|---|---|---|---|---|---|---|---|---|
| | C1 | D1, D2 | (mm) | number | B1, B2 | C1 | C2 | C1/C2 | 600° C. | 800° C. |
| test reference example 4.1 | 1.5 | 0.3 | 1.8 | 18 | 32.7 | 1.5 | 1.5 | 1.00 | no cracks | no cracks |
| test reference example 4.2 | 1.6 | 0.3 | 1.9 | 17 | 32.6 | 1.6 | 1.5 | 1.07 | no cracks | no cracks |
| test example 4.1 | 1.7 | 0.3 | 2 | 16 | 32.3 | 1.7 | 1.5 | 1.13 | no cracks | no cracks |
| test example 4.2 | 2.25 | 0.3 | 2.55 | 13 | 33.45 | 2.25 | 1.5 | 1.50 | no cracks | no cracks |
| test example 4.3 | 3 | 0.3 | 3.3 | 10 | 33.3 | 3 | 1.5 | 2.00 | no cracks | no cracks |
| test example 4.4 | 4.4 | 0.3 | 4.7 | 7 | 33.2 | 4.4 | 1.5 | 2.93 | no cracks | no cracks |
| test comparative example 4.1 | 4.6 | 0.3 | 4.9 | 7 | 34.6 | 4.6 | 1.5 | 3.07 | no cracks | cracks found |
| test comparative example 4.2 | 4.8 | 0.3 | 5.1 | 6 | 30.9 | 4.8 | 1.5 | 3.20 | cracks found | cracks found |

TABLE 5

| | side length (mm) | wall thickness (mm) | pitch | cell column | outer dimension (mm) | wall thickness (mm) | wall thickness (mm) | | thermal shock test | |
|---|---|---|---|---|---|---|---|---|---|---|
| | C1, C2 | D2 | (mm) | number | B1, B2 | D1 | D2 | D1/D2 | 600° C. | 800° C. |
| test reference example 5.1 | 1.5 | 0.4 | 1.9 | 18 | 34.6 | 0.4 | 0.4 | 1.00 | no cracks | no cracks |
| test reference example 5.2 | 1.5 | 0.37 | 1.87 | 18 | 34.03 | 0.4 | 0.37 | 1.08 | no cracks | no cracks |
| test reference example 5.3 | 1.5 | 0.3 | 1.8 | 18 | 32.7 | 0.3 | 0.3 | 1.00 | no cracks | no cracks |
| test example 5.1 | 1.5 | 0.35 | 1.85 | 18 | 33.65 | 0.4 | 0.35 | 1.14 | no cracks | no cracks |
| test example 5.2 | 1.5 | 0.2 | 1.7 | 20 | 34.2 | 0.4 | 0.2 | 2.00 | no cracks | no cracks |
| test example 5.3 | 1.5 | 0.14 | 1.64 | 20 | 32.94 | 0.4 | 0.14 | 2.86 | no cracks | no cracks |
| test example 5.4 | 1.5 | 0.15 | 1.65 | 20 | 33.15 | 0.3 | 0.15 | 2.00 | no cracks | no cracks |
| test comparative example 5.1 | 1.5 | 0.132 | 1.632 | 20 | 32.772 | 0.4 | 0.132 | 3.03 | cracks found | cracks found |
| test comparative example 5.2 | 1.5 | 0.13 | 1.63 | 20 | 32.73 | 0.4 | 0.13 | 3.08 | cracks found | cracks found |

TABLE 6

| | side length (mm) C1, C2 | wall thickness D2 | pitch (mm) | cell column | outer dimension B1, B2 | wall thickness (mm) D1 | wall thickness (mm) D2 | D1/D2 | thermal shock test 600° C. | 800° C. |
|---|---|---|---|---|---|---|---|---|---|---|
| test reference example 6.1 | 1.5 | 0.4 | 1.9 | 18 | 34.6 | 0.4 | 0.4 | 1.00 | no cracks | no cracks |
| test reference example 6.2 | 1.5 | 0.37 | 1.87 | 18 | 34.03 | 0.4 | 0.37 | 1.08 | no cracks | no cracks |
| test reference example 6.3 | 1.5 | 0.3 | 1.8 | 18 | 32.7 | 0.3 | 0.3 | 1.00 | no cracks | no cracks |
| test example 6.1 | 1.5 | 0.35 | 1.85 | 18 | 33.65 | 0.4 | 0.35 | 1.14 | no cracks | no cracks |
| test example 6.2 | 1.5 | 0.2 | 1.7 | 20 | 34.2 | 0.4 | 0.2 | 2.00 | no cracks | no cracks |
| test example 6.3 | 1.5 | 0.14 | 1.64 | 20 | 32.94 | 0.4 | 0.14 | 2.86 | no cracks | no cracks |
| test example 6.4 | 1.5 | 0.15 | 1.65 | 20 | 33.15 | 0.3 | 0.15 | 2.00 | no cracks | no cracks |
| test comparative example 6.1 | 1.5 | 0.132 | 1.632 | 20 | 32.772 | 0.4 | 0.132 | 3.03 | no cracks | cracks found |
| test comparative example 6.2 | 1.5 | 0.13 | 1.63 | 20 | 32.73 | 0.4 | 0.13 | 3.08 | cracks found | cracks found |

TABLE 7

| | | | assembly 9 | | filter F1 | | | cell 12 | | | cell wall 13 | | |
|---|---|---|---|---|---|---|---|---|---|---|---|---|---|
| | shape | type | A1 mm | A2 mm | B1 mm | B2 mm | quantity number | C1 mm | C2 mm | C1/C2 | D1 mm | D2 mm | D1/D2 |
| example 1-1 | FIG. 6(a) | test example 1.2 | 160 | 80 | 66 | 33 | 9 | 1.50 | 1.50 | 1.00 | 0.3 | 0.3 | 1.00 |
| comparative example 1-1 | FIG. 6(b) | test reference example 1.1 | 80 | 80 | 33 | 33 | 9 | 1.50 | 1.50 | 1.00 | 0.3 | 0.3 | 1.00 |
| comparative example 1-2 | FIG. 6(c) | test referece example 1.1 | 160 | 80 | 33 | 33 | 15 | 1.50 | 1.50 | 1.00 | 0.3 | 0.3 | 1.00 |
| example 1-2 | FIG. 6(a) | test example 2.2 | 160 | 80 | 66 | 33 | 9 | 1.50 | 1.50 | 1.00 | 0.3 | 0.3 | 1.00 |
| comparative example 1-3 | FIG. 6(b) | test example 2.1 | 80 | 80 | 33 | 33 | 9 | 1.50 | 1.50 | 1.00 | 0.3 | 0.3 | 1.00 |
| comparative example 1-4 | FIG. 6(c) | test example 2.1 | 160 | 80 | 33 | 33 | 15 | 1.50 | 1.50 | 1.00 | 0.3 | 0.3 | 1.00 |

| | sealing material layer 15 | | | peripheral portion mm | insulation mm | Temp. difference ΔT ° C. | temperature α ° C. | β ° C. | γ ° C. | cracks |
|---|---|---|---|---|---|---|---|---|---|---|
| | E1 mm | E2 mm | E1/E2 | | | | | | | |
| example 1-1 | 1 | 1 | 1 | 1.5 | 10 | 50 | 450 | 430 | 400 | none |
| comparative example 1-1 | 1 | 1 | 1 | 1.5 | 10 | 50 | 450 | 430 | 400 | none |
| comparative example 1-2 | 1 | 1 | 1 | 1.5 | 10 | 100 | 450 | 430 | 350 | found |
| example 1-2 | 1 | 1 | 1 | 1.5 | 10 | 60 | 450 | 424 | 390 | none |
| comparative example 1-3 | 1 | 1 | 1 | 1.5 | 10 | 60 | 450 | 425 | 390 | none |
| comparative example 1-4 | 1 | 1 | 1 | 1.5 | 10 | 110 | 450 | 423 | 340 | found |

TABLE 8

| | | | assembly 9 | | filter F1 | | | cell 12 | | | cell wall 13 | | |
|---|---|---|---|---|---|---|---|---|---|---|---|---|---|
| | shape | type | A1 mm | A2 mm | B1 mm | B2 mm | quantity number | C1 mm | C2 mm | C1/C2 | D1 mm | D2 mm | D1/D2 |
| example 2-1 | FIG. 7(a) | test example 3.1 | 160 | 80 | 33 | 33 | 15 | 1.70 | 1.50 | 1.13 | 0.3 | 0.3 | 1.00 |
| example 2-2 | FIG. 7(a) | test example 3.2 | 160 | 80 | 33 | 33 | 15 | 2.25 | 1.50 | 1.50 | 0.3 | 0.3 | 1.00 |
| example 2-3 | FIG. 7(a) | test example 3.3 | 160 | 80 | 33 | 33 | 15 | 3.00 | 1.50 | 2.00 | 0.3 | 0.3 | 1.00 |

TABLE 8-continued

| | | | | | | | | | | | | | |
|---|---|---|---|---|---|---|---|---|---|---|---|---|---|
| example 2-4 | FIG. 7(a) | test example 3.4 | 160 | 80 | 33 | 33 | 15 | 4.40 | 1.50 | 2.93 | 0.3 | 0.3 | 1.00 |
| comparative example 2-1 | FIG. 7(b) | test reference example 3.1 | 160 | 80 | 33 | 33 | 15 | 1.50 | 1.50 | 1.00 | 0.3 | 0.3 | 1.00 |
| comparative example 2-2 | FIG. 7(c) | test reference example 3.1 | 160 | 80 | 33 | 33 | 15 | 1.50 | 1.70 | 0.88 | 0.3 | 0.3 | 1.00 |
| comparative example 2-3 | FIG. 7(c) | test reference example 3.2 | 160 | 80 | 33 | 33 | 15 | 1.50 | 2.25 | 0.67 | 0.3 | 0.3 | 1.00 |
| comparative example 2-4 | FIG. 7(a) | test reference example 3.1 | 160 | 80 | 33 | 33 | 15 | 4.60 | 1.50 | 3.07 | 0.3 | 0.3 | 1.00 |
| example 2-5 | FIG. 7(a) | test example 4.1 | 160 | 80 | 33 | 33 | 15 | 1.70 | 1.50 | 1.13 | 0.3 | 0.3 | 1.00 |
| example 2-6 | FIG. 7(a) | test example 4.2 | 160 | 80 | 33 | 33 | 15 | 2.25 | 1.50 | 1.50 | 0.3 | 0.3 | 1.00 |
| example 2-7 | FIG. 7(a) | test example 4.3 | 160 | 80 | 33 | 33 | 15 | 3.00 | 1.50 | 2.00 | 0.3 | 0.3 | 1.00 |
| example 2-8 | FIG. 7(a) | test example 4.4 | 160 | 80 | 33 | 33 | 15 | 4.40 | 1.50 | 2.93 | 0.3 | 0.3 | 1.00 |
| comparative example 2-5 | FIG. 7(b) | test reference example 4.1 | 160 | 80 | 33 | 33 | 15 | 1.50 | 1.50 | 1.00 | 0.3 | 0.3 | 1.00 |
| comparative example 2-6 | FIG. 7(c) | test reference example 4.1 | 160 | 80 | 33 | 33 | 15 | 1.50 | 1.70 | 0.88 | 0.3 | 0.3 | 1.00 |
| comparative example 2-7 | FIG. 7(c) | test reference example 4.2 | 160 | 80 | 33 | 33 | 15 | 1.50 | 2.25 | 0.67 | 0.3 | 0.3 | 1.00 |
| comparative example 2-8 | FIG. 7(a) | test reference example 4.1 | 160 | 80 | 33 | 33 | 15 | 4.60 | 1.50 | 3.07 | 0.3 | 0.3 | 1.00 |

| | sealing material layer 15 | | | peripheral portion mm | insulation mm | temperature difference ΔT °C. | temperature | | | cracks |
|---|---|---|---|---|---|---|---|---|---|---|
| | E1 mm | E2 mm | E1/E2 | | | | α °C. | β °C. | γ °C. | |
| example 2-1 | 1 | 1 | 1 | 1.5 | 10 | 93 | 450 | 430 | 357 | none |
| example 2-2 | 1 | 1 | 1 | 1.5 | 10 | 80 | 450 | 430 | 370 | none |
| example 2-3 | 1 | 1 | 1 | 1.5 | 10 | 76 | 450 | 430 | 374 | none |
| example 2-4 | 1 | 1 | 1 | 1.5 | 10 | 70 | 450 | 430 | 380 | none |
| comparative example 2-1 | 1 | 1 | 1 | 1.5 | 10 | 100 | 450 | 430 | 350 | found |
| comparative example 2-2 | 1 | 1 | 1 | 1.5 | 10 | 100 | 450 | 434 | 350 | found |
| comparative example 2-3 | 1 | 1 | 1 | 1.5 | 10 | 100 | 450 | 440 | 350 | found |
| comparative example 2-4 | 1 | 1 | 1 | 1.5 | 10 | 65 | 450 | 430 | 385 | found |
| example 2-5 | 1 | 1 | 1 | 1.5 | 10 | 103 | 450 | 423 | 347 | none |
| example 2-6 | 1 | 1 | 1 | 1.5 | 10 | 90 | 450 | 423 | 360 | none |
| example 2-7 | 1 | 1 | 1 | 1.5 | 10 | 86 | 450 | 423 | 364 | none |
| example 2-8 | 1 | 1 | 1 | 1.5 | 10 | 80 | 450 | 423 | 370 | none |
| comparative example 2-5 | 1 | 1 | 1 | 1.5 | 10 | 110 | 450 | 423 | 340 | found |
| comparative example 2-6 | 1 | 1 | 1 | 1.5 | 10 | 120 | 450 | 434 | 340 | found |
| comparative example 2-7 | 1 | 1 | 1 | 1.5 | 10 | 110 | 450 | 440 | 340 | found |
| comparative example 2-8 | 1 | 1 | 1 | 1.5 | 10 | 75 | 450 | 430 | 375 | found |

TABLE 9

| | assembly 9 | | filter F1 | | | | cell 12 | | | cell wall 13 | | |
|---|---|---|---|---|---|---|---|---|---|---|---|---|
| | shape | type | A1 mm | A2 mm | B1 mm | B2 mm | quantity number | C1 mm | C2 mm | C1/C2 | D1 mm | D2 mm | D1/D2 |
| example 3-1 | FIG. 8(a) | test example 5.1 | 160 | 80 | 33 | 33 | 15 | 1.50 | 1.50 | 1.00 | 0.4 | 0.35 | 1.14 |
| example 3-2 | FIG. 8(a) | test example 5.2 | 160 | 80 | 33 | 33 | 15 | 1.50 | 1.50 | 1.00 | 0.4 | 0.2 | 2.00 |
| example 3-3 | FIG. 8(a) | test example 5.3 | 160 | 80 | 33 | 33 | 15 | 1.50 | 1.50 | 1.00 | 0.4 | 0.14 | 2.86 |
| example 3-4 | FIG. 8(a) | test example 5.4 | 160 | 80 | 33 | 33 | 15 | 1.50 | 1.50 | 1.00 | 0.3 | 0.15 | 2.00 |
| comparative example 3-1 | FIG. 8(b) | test reference example 5.3 | 160 | 80 | 33 | 33 | 15 | 1.50 | 1.50 | 1.00 | 0.3 | 0.3 | 1.00 |

TABLE 9-continued

| | Shape | type | A1 mm | A2 mm | B1 mm | B2 mm | quantity number | C1 mm | C2 mm | C1/C2 | D1 mm | D2 mm | D1/D2 |
|---|---|---|---|---|---|---|---|---|---|---|---|---|---|
| comparative example 3-2 | FIG. 8(c) | test example 5.1 | 160 | 80 | 33 | 33 | 15 | 1.50 | 1.50 | 1.00 | 0.35 | 0.4 | 0.88 |
| comparative example 3-3 | FIG. 8(c) | test example 5.4 | 160 | 80 | 33 | 33 | 15 | 1.50 | 1.50 | 1.00 | 0.15 | 0.3 | 0.50 |
| comparative example 3-4 | FIG. 8(a) | test compartive example 5.1 | 160 | 80 | 33 | 33 | 15 | 1.50 | 1.50 | 1.00 | 0.4 | 0.132 | 3.03 |
| example 3-5 | FIG. 8(a) | test example 6.1 | 160 | 80 | 33 | 33 | 15 | 1.50 | 1.50 | 1.00 | 0.4 | 0.35 | 1.14 |
| example 3-6 | FIG. 8(a) | test example 6.2 | 160 | 80 | 33 | 33 | 15 | 1.50 | 1.50 | 1.00 | 0.4 | 0.2 | 2.00 |
| example 3-7 | FIG. 8(a) | test example 6.3 | 160 | 80 | 33 | 33 | 15 | 1.50 | 1.50 | 1.00 | 0.4 | 0.14 | 2.86 |
| example 3-8 | FIG. 8(a) | test example 6.4 | 160 | 80 | 33 | 33 | 15 | 1.50 | 1.50 | 1.00 | 0.3 | 0.15 | 2.00 |
| comparative example 3-5 | FIG. 8(b) | test reference example 6.3 | 160 | 80 | 33 | 33 | 15 | 1.50 | 1.50 | 1.00 | 0.3 | 0.3 | 1.00 |
| comparative example 3-6 | FIG. 8(c) | test example 6.1 | 160 | 80 | 33 | 33 | 15 | 1.50 | 1.50 | 1.00 | 0.35 | 0.4 | 0.88 |
| comparative example 3-7 | FIG. 8(c) | test example 6.4 | 160 | 80 | 33 | 33 | 15 | 1.50 | 1.50 | 1.00 | 0.15 | 0.3 | 0.50 |
| comparative example 3-8 | FIG. 8(a) | test compartive example 6.1 | 160 | 80 | 33 | 33 | 15 | 1.50 | 1.50 | 1.00 | 0.4 | 0.132 | 3.03 |

| | sealing material layer 15 | | | peripheral portion mm | insulation mm | Temp. difference ΔT °C. | temperature α °C. | β °C. | γ °C. | cracks |
|---|---|---|---|---|---|---|---|---|---|---|
| | E1 mm | E2 mm | E1/E2 | | | | | | | |
| example 3-1 | 1 | 1 | 1 | 1.5 | 10 | 91 | 450 | 423 | 359 | none |
| example 3-2 | 1 | 1 | 1 | 1.5 | 10 | 79 | 450 | 428 | 371 | none |
| example 3-3 | 1 | 1 | 1 | 1.5 | 10 | 73 | 450 | 424 | 377 | none |
| example 3-4 | 1 | 1 | 1 | 1.5 | 10 | 85 | 450 | 425 | 365 | none |
| comparative example 3-1 | 1 | 1 | 1 | 1.5 | 10 | 100 | 450 | 430 | 350 | found |
| comparative example 3-2 | 1 | 1 | 1 | 1.5 | 10 | 95 | 450 | 435 | 355 | found |
| comparative example 3-3 | 1 | 1 | 1 | 1.5 | 10 | 110 | 450 | 430 | 340 | found |
| comparative example 3-4 | 1 | 1 | 1 | 1.5 | 10 | 68 | 450 | 430 | 382 | found |
| example 3-5 | 1 | 1 | 1 | 1.5 | 10 | 101 | 450 | 416 | 349 | none |
| example 3-6 | 1 | 1 | 1 | 1.5 | 10 | 90 | 450 | 420 | 360 | none |
| example 3-7 | 1 | 1 | 1 | 1.5 | 10 | 82 | 450 | 415 | 368 | none |
| example 3-8 | 1 | 1 | 1 | 1.5 | 10 | 95 | 450 | 413 | 355 | none |
| comparative example 3-5 | 1 | 1 | 1 | 1.5 | 10 | 110 | 450 | 423 | 340 | found |
| comparative example 3-6 | 1 | 1 | 1 | 1.5 | 10 | 105 | 450 | 428 | 345 | found |
| comparative example 3-7 | 1 | 1 | 1 | 1.5 | 10 | 120 | 450 | 423 | 330 | found |
| comparative example 3-8 | 1 | 1 | 1 | 1.5 | 10 | 75 | 450 | 430 | 375 | found |

TABLE 10

| | | | assembly 9 | | filter F1 | | | cell 12 | | | cell wall 13 | | |
|---|---|---|---|---|---|---|---|---|---|---|---|---|---|
| | Shape | type | A1 mm | A2 mm | B1 mm | B2 mm | quantity number | C1 mm | C2 mm | C1/C2 | D1 mm | D2 mm | D1/D2 |
| example 4-1 | FIG. 9(a) | test reference example 1.1 | 160 | 80 | 33 | 33 | 15 | 1.50 | 1.50 | 1.00 | 0.3 | 0.3 | 1.00 |
| example 4-2 | FIG. 9(a) | test reference example 1.1 | 160 | 80 | 33 | 33 | 15 | 1.50 | 1.50 | 1.00 | 0.3 | 0.3 | 1.00 |
| example 4-3 | FIG. 9(a) | test reference example 1.1 | 160 | 80 | 33 | 33 | 15 | 1.50 | 1.50 | 1.00 | 0.3 | 0.3 | 1.00 |
| example 4-4 | FIG. 9(a) | test reference example 1.1 | 160 | 80 | 33 | 33 | 15 | 1.50 | 1.50 | 1.00 | 0.3 | 0.3 | 1.00 |
| example 4-5 | FIG. 9(a) | test reference example 1.1 | 160 | 80 | 33 | 33 | 15 | 1.50 | 1.50 | 1.00 | 0.3 | 0.3 | 1.00 |
| comparative example 4-1 | FIG. 9(b) | test reference example 1.1 | 160 | 80 | 33 | 33 | 15 | 1.50 | 1.50 | 1.00 | 0.3 | 0.3 | 1.00 |
| comparative example 4-2 | FIG. 9(c) | test reference example 1.1 | 160 | 80 | 33 | 33 | 15 | 1.50 | 1.50 | 1.00 | 0.3 | 0.3 | 1.00 |
| comparative | FIG. | test reference | 160 | 80 | 33 | 33 | 15 | 1.50 | 1.50 | 1.00 | 0.3 | 0.3 | 1.00 |

TABLE 10-continued

| | | | | | | | | | | | | | |
|---|---|---|---|---|---|---|---|---|---|---|---|---|---|
| example 4-3 | 9(a) | example 1.1 | | | | | | | | | | | |
| example 4-6 | FIG. 9(a) | test reference example 2.1 | 160 | 80 | 33 | 33 | 15 | 1.50 | 1.50 | 1.00 | 0.3 | 0.3 | 1.00 |
| example 4-7 | FIG. 9(a) | test reference example 2.1 | 160 | 80 | 33 | 33 | 15 | 1.50 | 1.50 | 1.00 | 0.3 | 0.3 | 1.00 |
| example 4-8 | FIG. 9(a) | test reference example 2.1 | 160 | 80 | 33 | 33 | 15 | 1.50 | 1.50 | 1.00 | 0.3 | 0.3 | 1.00 |
| example 4-9 | FIG. 9(a) | test reference example 2.1 | 160 | 80 | 33 | 33 | 15 | 1.50 | 1.50 | 1.00 | 0.3 | 0.3 | 1.00 |
| example 4-10 | FIG. 9(a) | test reference example 2.1 | 160 | 80 | 33 | 33 | 15 | 1.50 | 1.50 | 1.00 | 0.3 | 0.3 | 1.00 |
| comparative example 4-4 | FIG. 9(b) | test reference example 2.1 | 160 | 80 | 33 | 33 | 15 | 1.50 | 1.50 | 1.00 | 0.3 | 0.3 | 1.00 |
| comparative example 4-5 | FIG. 9(c) | test reference example 2.1 | 160 | 80 | 33 | 33 | 15 | 1.50 | 1.50 | 1.00 | 0.3 | 0.3 | 1.00 |
| comparative example 4-6 | FIG. 9(a) | test reference example 2.1 | 160 | 80 | 33 | 33 | 15 | 1.50 | 1.50 | 1.00 | 0.3 | 0.3 | 1.00 |

| | sealing material layer 15 | | | peripheral portion | Temp. insulation | difference | temperature | | | |
|---|---|---|---|---|---|---|---|---|---|---|
| | E1 mm | E2 mm | E1/E2 | mm | mm | β − γ | α | β | γ | cracks |
| example 4-1 | 1.05 | 1 | 1.05 | 1.5 | 10 | 75 | 450 | 425 | 350 | none |
| example 4-2 | 2 | 1 | 2 | 1.5 | 10 | 75 | 450 | 425 | 350 | none |
| example 4-3 | 3 | 1 | 3 | 1.5 | 10 | 65 | 450 | 415 | 350 | none |
| example 4-4 | 4 | 1 | 4 | 1.5 | 10 | 20 | 450 | 370 | 350 | none |
| example 4-5 | 5 | 1 | 5 | 1.5 | 10 | 0 | 450 | 350 | 350 | none |
| comparative example 4-1 | 1 | 1 | 1 | 1.5 | 10 | 80 | 450 | 430 | 350 | found |
| comparative example 4-2 | 1 | 2 | 0.5 | 1.5 | 10 | 130 | 450 | 440 | 310 | found |
| comparative example 4-3 | 6 | 1 | 6 | 1.5 | 10 | −20 | 450 | 330 | 350 | found |
| example 4-6 | 1.05 | 1 | 1.05 | 1.5 | 10 | 75 | 450 | 415 | 340 | none |
| example 4-7 | 2 | 1 | 2 | 1.5 | 10 | 75 | 450 | 415 | 340 | none |
| example 4-8 | 3 | 1 | 3 | 1.5 | 10 | 71 | 450 | 411 | 340 | none |
| example 4-9 | 4 | 1 | 4 | 1.5 | 10 | 25 | 450 | 365 | 340 | none |
| example 4-10 | 5 | 1 | 5 | 1.5 | 10 | 2 | 450 | 342 | 340 | none |
| comparative example 4-4 | 1 | 1 | 1 | 1.5 | 10 | 83 | 450 | 423 | 340 | found |
| comparative example 4-5 | 1 | 2 | 0.5 | 1.5 | 10 | 132 | 450 | 432 | 300 | found |
| comparative example 4-6 | 6 | 1 | 6 | 1.5 | 10 | −10 | 450 | 330 | 340 | found |

TABLE 11

| | | | assembly 9 | | filter F1 | | | SiC | | | | | sealing material layer 15 | | |
|---|---|---|---|---|---|---|---|---|---|---|---|---|---|---|---|
| | shape | type | long axis A1 mm | short axis A2 mm | long side B1 mm | short side B2 mm | quantity number | ceramic fibers wt % | average diameter 0.3 μm wt % | silica sol wt % | CMC wt % | water wt % | long axis E1 mm | short axis E2 mm | E1/E2 |
| example 5-1 | FIG. 10(a) | test reference example 1.1 | 160 | 80 | 33 | 33 | 15 | 31.10 | 15.00 | 14.40 | 0.50 | 39.00 | 1 | 1 | 1 |
| example 5-2 | FIG. 10(a) | test reference example 1.1 | 160 | 80 | 33 | 33 | 15 | 34.00 | 7.50 | 19.00 | 0.50 | 39.00 | 1 | 1 | 1 |
| example 5-3 | FIG. 10(a) | test reference example 1.1 | 160 | 80 | 33 | 33 | 15 | 30.30 | 3.00 | 27.20 | 0.50 | 39.00 | 1 | 1 | 1 |
| example 5-4 | FIG. 10(a) | test reference example 1.1 | 160 | 80 | 33 | 33 | 15 | 31.30 | 0.50 | 28.70 | 0.50 | 39.00 | 1 | 1 | 1 |
| comparative example 5-1 | FIG. 10(b) | test reference example 1.1 | 160 | 80 | 33 | 33 | 15 | 23.30 | 30.20 | 7.00 | 0.50 | 39.00 | 1 | 1 | 1 |
| comparative example 5-2 | FIG. 10(c) | test reference example 1.1 | 160 | 80 | 33 | 33 | 15 | 13.50 | 40.00 | 7.00 | 0.50 | 39.00 | 1 | 1 | 1 |
| comparative example 5-3 | FIG. 10(a) | test reference example 1.1 | 160 | 80 | 33 | 33 | 15 | 31.30 | 0.20 | 29.00 | 0.50 | 39.00 | 1 | 1 | 1 |
| example 5-5 | FIG. 10(a) | test reference example 2.1 | 160 | 80 | 33 | 33 | 15 | 31.10 | 15.00 | 14.40 | 0.50 | 39.00 | 1 | 1 | 1 |
| example 5-6 | FIG. 10(a) | test reference example 2.1 | 160 | 80 | 33 | 33 | 15 | 34.00 | 7.50 | 19.00 | 0.50 | 39.00 | 1 | 1 | 1 |

TABLE 11-continued

| | shape | type | A1 mm | A2 mm | B1 mm | B2 mm | quantity number | SiC wt % | ceramic fibers wt % | average diameter 0.3μ wt % | silica sol wt % | CMC wt % | water wt % |
|---|---|---|---|---|---|---|---|---|---|---|---|---|---|
| example 5-7 | FIG. 10(a) | test reference example 2.1 | 160 | 80 | 33 | 33 | 15 | 30.30 | 3.00 | 27.20 | 0.50 | 39.00 | 1 | 1 | 1 |
| example 5-8 | FIG. 10(a) | test reference example 2.2 | 160 | 80 | 33 | 33 | 15 | 31.30 | 0.50 | 28.70 | 0.50 | 39.00 | 1 | 1 | 1 |
| comparative example 5-4 | FIG. 10(b) | test reference example 2.3 | 160 | 80 | 33 | 33 | 15 | 23.30 | 30.20 | 7.00 | 0.50 | 39.00 | 1 | 1 | 1 |
| comparative example 5-5 | FIG. 10(c) | test reference example 2.4 | 160 | 80 | 33 | 33 | 15 | 13.50 | 40.00 | 7.00 | 0.50 | 39.00 | 1 | 1 | 1 |
| comparative example 5-6 | FIG. 10(a) | test reference example 2.1 | 160 | 80 | 33 | 33 | 15 | 31.30 | 0.20 | 29.00 | 0.50 | 39.00 | 1 | 1 | 1 |

| | thermal conductivity | | | peripheral portion | insulation | Temp. difference | temperature | | | |
|---|---|---|---|---|---|---|---|---|---|---|
| | long axis G1 W/m·K | short axis G2 W/m·K | G1/G2 | mm | mm | β − γ | α | β | γ | cracks |
| example 5-1 | 0.2 | 0.3 | 0.67 | 1.5 | 10 | 76 | 450 | 426 | 350 | none |
| example 5-2 | 0.15 | 0.3 | 0.50 | 1.5 | 10 | 75 | 450 | 425 | 350 | none |
| example 5-3 | 0.1 | 0.3 | 0.33 | 1.5 | 10 | 65 | 450 | 415 | 350 | none |
| example 5-4 | 0.06 | 0.3 | 0.20 | 1.5 | 10 | 0 | 450 | 350 | 350 | none |
| comparative example 5-1 | 0.3 | 0.3 | 1.00 | 1.5 | 10 | 80 | 450 | 430 | 350 | found |
| comparative example 5-2 | 0.6 | 0.3 | 2.00 | 1.5 | 10 | 90 | 450 | 440 | 350 | found |
| comparative example 5-3 | 0.05 | 0.3 | 0.17 | 1.5 | 10 | −20 | 450 | 330 | 350 | found |
| example 5-5 | 0.2 | 0.3 | 0.67 | 1.5 | 10 | 76 | 450 | 416 | 340 | none |
| example 5-6 | 0.15 | 0.3 | 0.50 | 1.5 | 10 | 75 | 450 | 415 | 340 | none |
| example 5-7 | 0.1 | 0.3 | 0.33 | 1.5 | 10 | 71 | 450 | 411 | 340 | none |
| example 5-8 | 0.06 | 0.3 | 0.20 | 1.5 | 10 | 2 | 450 | 342 | 340 | none |
| comparative example 5-4 | 0.3 | 0.3 | 1.00 | 1.5 | 10 | 83 | 450 | 423 | 340 | found |
| comparative example 5-5 | 0.6 | 0.3 | 2.00 | 1.5 | 10 | 92 | 450 | 432 | 340 | found |
| comparative example 5-6 | 0.05 | 0.3 | 0.17 | 1.5 | 10 | −10 | 450 | 330 | 340 | found |

TABLE 12

| | | | assembly 9 | | filter F1 | | | SiC | | | | | |
|---|---|---|---|---|---|---|---|---|---|---|---|---|---|
| | shape | type | long axis A1 mm | short axis A2 mm | long axis B1 mm | short axis B2 mm | quantity number | ceramic fibers wt % | average diameter 0.3μ wt % | silica sol wt % | CMC wt % | water wt % | total |
| example 6-1 | FIG. 10(a) | test reference example 1.1 | 160 | 80 | 33 | 33 | 15 | 23.30 | 30.20 | 7.00 | 0.50 | 39.00 | 100.00 |
| example 6-2 | FIG. 10(a) | test reference example 1.1 | 160 | 80 | 33 | 33 | 15 | 23.30 | 30.20 | 7.00 | 0.50 | 39.00 | 100.00 |
| example 6-3 | FIG. 10(a) | test reference example 1.1 | 160 | 80 | 33 | 33 | 15 | 23.30 | 30.20 | 7.00 | 0.50 | 39.00 | 100.00 |
| example 6-4 | FIG. 10(a) | test reference example 1.1 | 160 | 80 | 33 | 33 | 15 | 23.30 | 30.20 | 7.00 | 0.50 | 39.00 | 100.00 |
| comparative example 6-1 | FIG. 10(b) | test reference example 1.1 | 160 | 80 | 33 | 33 | 15 | 23.30 | 30.20 | 7.00 | 0.50 | 39.00 | 100.00 |
| comparative example 6-2 | FIG. 10(c) | test reference example 1.1 | 160 | 80 | 33 | 33 | 15 | 23.30 | 30.20 | 7.00 | 0.50 | 39.00 | 100.00 |
| comparative example 6-3 | FIG. 10(a) | test reference example 1.1 | 160 | 80 | 33 | 33 | 15 | 23.30 | 30.20 | 7.00 | 0.50 | 39.00 | 100.00 |
| example 6-5 | FIG. 10(a) | test reference example 2.1 | 160 | 80 | 33 | 33 | 15 | 23.30 | 30.20 | 7.00 | 0.50 | 39.00 | 100.00 |
| example 6-6 | FIG. 10(a) | test reference example 2.1 | 160 | 80 | 33 | 33 | 15 | 23.30 | 30.20 | 7.00 | 0.50 | 39.00 | 100.00 |
| example 6-7 | FIG. 10(a) | test reference example 2.1 | 160 | 80 | 33 | 33 | 15 | 23.30 | 30.20 | 7.00 | 0.50 | 39.00 | 100.00 |
| example 6-8 | FIG. 10(a) | test reference example 2.1 | 160 | 80 | 33 | 33 | 15 | 23.30 | 30.20 | 7.00 | 0.50 | 39.00 | 100.00 |
| comparative example 6-4 | FIG. 10(b) | test reference example 2.1 | 160 | 80 | 33 | 33 | 15 | 23.30 | 30.20 | 7.00 | 0.50 | 39.00 | 100.00 |

TABLE 12-continued

| | | | | | | | | | | | | |
|---|---|---|---|---|---|---|---|---|---|---|---|---|
| comparative example 6-5 | FIG. 10(c) | test reference example 2.1 | 160 | 80 | 33 | 33 | 15 | 23.30 | 30.20 | 7.00 | 0.50 | 39.00 | 100.00 |
| comparative example 6-6 | FIG. 10(a) | test reference example 2.1 | 160 | 80 | 33 | 33 | 15 | 23.30 | 30.20 | 7.00 | 0.50 | 39.00 | 100.00 |

| | sealing material layer 15 | | | outer sealing material | | | | | temperature | | | |
|---|---|---|---|---|---|---|---|---|---|---|---|---|
| | long axis E1 | short axis E2 | | short axis H2 | long axis H1 | | insulation | Temp. difference | | | | |
| | mm | mm | E1/E2 | mm | mm | H2/H1 | mm | β − γ | α | β | γ | cracks |
| example 6-1 | 1 | 1 | 1 | 1.5 | 1.6 | 0.94 | 10 | 73 | 450 | 423 | 350 | none |
| example 6-2 | 1 | 1 | 1 | 1.5 | 10.0 | 0.15 | 10 | 70 | 450 | 420 | 350 | none |
| example 6-3 | 1 | 1 | 1 | 1.5 | 20.0 | 0.08 | 10 | 60 | 450 | 410 | 350 | none |
| example 6-4 | 1 | 1 | 1 | 1.5 | 25.0 | 0.06 | 10 | 0 | 450 | 350 | 350 | none |
| comparative example 6-1 | 1 | 1 | 1 | 1.5 | 1.5 | 1.00 | 10 | 80 | 450 | 430 | 350 | found |
| comparative example 6-2 | 1 | 1 | 1 | 1.5 | 1.0 | 1.50 | 10 | 90 | 450 | 440 | 350 | found |
| comparative example 6-3 | 1 | 1 | 1 | 1.5 | 30.0 | 0.05 | 10 | −30 | 450 | 320 | 350 | found |
| example 6-5 | 1 | 1 | 1 | 1.5 | 1.6 | 0.94 | 10 | 80 | 450 | 420 | 340 | none |
| example 6-6 | 1 | 1 | 1 | 1.5 | 10.0 | 0.15 | 10 | 78 | 450 | 418 | 340 | none |
| example 6-7 | 1 | 1 | 1 | 1.5 | 20.0 | 0.08 | 10 | 68 | 450 | 408 | 340 | none |
| example 6-8 | 1 | 1 | 1 | 1.5 | 25.0 | 0.06 | 10 | 2 | 450 | 342 | 340 | none |
| comparative example 6-4 | 1 | 1 | 1 | 1.5 | 1.5 | 1.00 | 10 | 83 | 450 | 423 | 340 | found |
| comparative example 6-5 | 1 | 1 | 1 | 1.5 | 1.0 | 1.50 | 10 | 98 | 450 | 438 | 340 | found |
| comparative example 6-6 | 1 | 1 | 1 | 1.5 | 30.0 | 0.05 | 10 | −10 | 450 | 330 | 340 | found |

TABLE 13

| | | | assembly 9 | | filter F1 | | | sealing material layer 15 | | | outer sealing material | | |
|---|---|---|---|---|---|---|---|---|---|---|---|---|---|
| | shape | type | long axis A1 mm | short axis A2 mm | long axis B1 mm | short axis B2 mm | quantity number | long axis E1 mm | short axis E2 mm | E1/E2 | long axis H1 mm | short axis H2 mm | H1/H2 |
| example 7-1 | FIG. 10(a) | test reference example 1.1 | 160 | 80 | 33 | 33 | 15 | 1 | 1 | 1 | 1.5 | 1.5 | 1.00 |
| example 7-2 | FIG. 10(a) | test reference example 1.1 | 160 | 80 | 33 | 33 | 15 | 1 | 1 | 1 | 1.5 | 1.5 | 1.00 |
| example 7-3 | FIG. 10(a) | test reference example 1.1 | 160 | 80 | 33 | 33 | 15 | 1 | 1 | 1 | 1.5 | 1.5 | 1.00 |
| comparative example 7-1 | FIG. 10(b) | test reference example 1.1 | 160 | 80 | 33 | 33 | 15 | 1 | 1 | 1 | 1.5 | 1.5 | 1.00 |
| comparative example 7-2 | FIG. 10(c) | test reference example 1.1 | 160 | 80 | 33 | 33 | 15 | 1 | 1 | 1 | 1.5 | 1.5 | 1.00 |
| comparative example 7-3 | FIG. 10(a) | test reference example 1.1 | 160 | 80 | 33 | 33 | 15 | 1 | 1 | 1 | 1.5 | 1.5 | 1.00 |
| example 7-4 | FIG. 10(a) | test reference example 2.1 | 160 | 80 | 33 | 33 | 15 | 1 | 1 | 1 | 1.5 | 1.5 | 1.0 |
| example 7-5 | FIG. 10(a) | test reference example 2.1 | 160 | 80 | 33 | 33 | 15 | 1 | 1 | 1 | 1.5 | 1.5 | 1 |
| example 7-6 | FIG. 10(a) | test reference example 2.1 | 160 | 80 | 33 | 33 | 15 | 1 | 1 | 1 | 1.5 | 1.5 | 1 |
| comparative example 7-4 | FIG. 10(b) | test reference example 2.1 | 160 | 80 | 33 | 33 | 15 | 1 | 1 | 1 | 1.5 | 1.5 | 1 |
| comparative example 7-5 | FIG. 10(c) | test reference example 2.1 | 160 | 80 | 33 | 33 | 15 | 1 | 1 | 1 | 1.5 | 1.5 | 1 |
| comparative example 7-6 | FIG. 10(a) | test reference example 2.1 | 160 | 80 | 33 | 33 | 15 | 1 | 1 | 1 | 1.5 | 1.5 | 1 |

TABLE 13-continued

| | | outer insulation material | | | Temp. difference | temperature | | | |
|---|---|---|---|---|---|---|---|---|---|
| | | short axis I2 | long axis I1 | | | | | | |
| | | mm | mm | I2/I1 | β − γ | α | β | γ | cracks |
| example 7-1 | | 10 | 11 | 0.91 | 73 | 450 | 423 | 350 | none |
| example 7-2 | | 10 | 20 | 0.50 | 70 | 450 | 420 | 350 | none |
| example 7-3 | | 10 | 30 | 0.33 | 0 | 450 | 350 | 350 | none |
| comparative example 7-1 | | 10 | 10 | 1.00 | 80 | 450 | 430 | 350 | found |
| comparative example 7-2 | | 10 | 35 | 0.29 | 90 | 450 | 440 | 350 | found |
| comparative example 7-3 | | 10 | 9 | 1.11 | −30 | 450 | 320 | 350 | found |
| example 7-4 | | 10 | 11 | 0.91 | 80 | 450 | 420 | 340 | none |
| example 7-5 | | 10 | 20 | 0.50 | 78 | 450 | 418 | 340 | none |
| example 7-6 | | 10 | 30 | 0.33 | 2 | 450 | 342 | 340 | none |
| comparative example 7-4 | | 10 | 10 | 1.00 | 83 | 450 | 423 | 340 | found |
| comparative example 7-5 | | 10 | 35 | 0.29 | 98 | 450 | 438 | 340 | found |
| comparative example 7-6 | | 10 | 9 | 1.11 | −10 | 450 | 330 | 340 | found |

The invention claimed is:

1. A ceramic filter assembly comprising:
major and minor axes;
a plurality of columnar honeycomb filters adhered together;
the plurality of columnar honeycomb filters being made of a porous ceramic sintered material with a ceramic sealing material layer and having end faces and a generally elliptical cross sectional shape when cut parallel to the end faces of the plurality of honeycomb filters;
the plurality of honeycomb filters including a honeycomb filter having a rectangular cross sectional shape when cut parallel to the end faces and provided with a long side having a length B1 and a short side having a length B2 in which the ratio B1/B2 is between 1.1 and 3.0;
the honeycomb filter being arranged so that the long side and the short side of the honeycomb filter are respectively parallel to the major axis and the minor axis of the assembly.

2. A ceramic filter assembly comprising;
major and minor axes;
a plurality of columnar honeycomb filters adhered together;
the plurality of columnar honeycomb filters being made of a porous ceramic sintered material with a ceramic sealing material layer and having end faces and a generally elliptical cross sectional shape when cut parallel to end faces of the plurality of honeycomb filters;
each honeycomb filter including a plurality of rectangular cells extending along an axis of the filter with each cell provided with a long side having a length C1 and a short side having a length C2 in which the ratio C1/C2 is between 1.1 and 3.0; and
the plurality of honeycomb filters being arranged so that the long sides of the cells are parallel to the major axis of the assembly and the short sides of the cells are parallel to the minor axis of the assembly.

3. A ceramic filter assembly comprising:
major and minor axes;
a plurality of columnar honeycomb filters adhered together;
the plurality of columnar honeycomb filters being made of a porous ceramic sintered material with a ceramic sealing material layer and having end faces and a generally elliptical cross sectional shape when cut parallel to the end faces of the plurality of honeycomb filters;
each honeycomb filter including an axis and a plurality of rectangular cells extending along the axis of the filter and defined by relatively thick cell walls and relatively thin walls that are orthogonal to each other; and
the plurality of honeycomb filters being arranged so that the relatively thick cell walls are parallel to the major axis of the assembly and the relatively thin cell walls are parallel to the minor axis of the assembly.

4. The ceramic filter assembly as claimed in claim 3, wherein when the thickness of the relatively thick cell walls is represented by D1 and the thickness of the relatively thin cell walls is represented by D2, D1 and D2 are within a range of 0.1 to 0.5 mm, and the ratio D1/D2 is 3 or less.

5. A ceramic filter assembly comprising:
a major axis;
a plurality of columnar honeycomb filters including outer surfaces adhered together;
the plurality of colunmar honeycomb filters being made of a porous ceramic sintered material with a ceramic sealing material layer and having end faces and a generally elliptical cross sectional shape when cut parallel to the end faces of the plurality of honeycomb filters; and
the ceramic sealing material layer including,
a first sealing material layer extending parallel to the major axis of the assembly, and
a second sealing material layer extending orthogonal to the major axis of the assembly, wherein the first sealing material layer is thicker than the second sealing material layer.

6. The ceramic filter assembly as claimed in claim 5, wherein when the thickness of the first sealing material layer is represented by E1 and the thickness of the second sealing material layer is represented by E2, E1 and E2 are between 0.3 mm to 3 mm, and the ratio E1/E2 is 1.05 or greater and 5 or less.

7. A ceramic filter assembly comprising:
a major axis;
a plurality of columnar honeycomb filters adhered together;
the plurality of columnar honeycomb filters being made of a porous ceramic sintered material with a ceramic sealing material layer and having end faces and a generally elliptical cross sectional shape when cut parallel to the end faces of the plurality of honeycomb filters; and
the ceramic sealing material layer including,
a first sealing material layer parallel to the major axis of the assembly, and
a second sealing material layer orthogonal to the major axis of the assembly, the first sealing material layer having thermal conductivity that is lower than the thermal conductivity of the second sealing material layer.

8. The ceramic filter assembly as claimed in claim 7, wherein when the thermal conductivity of the first sealing material layer is represented by G1 and the thermal conductivity of the second sealing material layer is represented by G2, the ratio G1/G2 is 0.2 or greater and 0.7 or less.

9. A ceramic filter assembly comprising:
an outer periphery, major, and minor axes;
a plurality of columnar honeycomb filters adhered together;
the plurality of columnar honeycomb filters being made of a porous ceramic sintered material with a ceramic sealing material layer made of ceramic and having end faces and a generally elliptical cross sectional shape when cut parallel to the end faces of the plurality of honeycomb filters;
an outer sealing material layer made of ceramic and formed on the periphery of the assembly; and
the outer sealing material layer including a first portion located along an extension of the major axis of the assembly that is thicker than a second portion located along an extension of the minor axis of the assembly.

10. The ceramic filter assembly as claimed in claim 9, wherein when the thickness of the first portion is represented by H1 and the thickness of the second portion is represented by H2, the ratio H2/H1 is 0.06 or greater and 0.95 or less.

11. The ceramic filter assembly as claimed in claim 9, wherein the outer sealing material layer is formed from two or more types of a coating material having different thermal conductivity.

12. A canning body comprising:
a ceramic filter assembly including major and minor axes and a plurality of columnar honeycomb filters adhered together, the plurality of columnar honeycomb filters being made of a porous ceramic sintered material with an inner sealing material layer made of ceramic and having end faces and a generally elliptical cross sectional shape when cut parallel to the end faces of the plurality of honeycomb filters;
a tubular casing for accommodating the ceramic filter assembly; and
a thermal insulation material arranged between the casing and the ceramic filter assembly, the thermal insulation material including a first portion located along an extension of the major axis of the assembly and a second portion located along an extension of the minor axis of the assembly, wherein the first portion is thicker than the second portion.

13. The canning body as claimed in claim 12, wherein when the thickness of the first portion is represented by I1 and the thickness of the second part is represented by I2, the ratio I2/I1 is 0.30 or greater and 0.91 or less.

14. The canning body as claimed in claim 12, wherein the thermal insulation material is made of two or more types of material having different thermal conductivity.

15. A columnar honeycomb filter comprising:
a plurality of rectangular cells extending along an axial direction of the honeycomb filter;
each rectangular cell being defined by a relatively thick cell wall and a relatively thin cell wall that are orthogonal to each other, and being made of a porous ceramic sintered material; and
the relatively thick cell walls having a uniform wall thickness and the relatively thin cell walls having a uniform wall thickness.

16. The columnar honeycomb filter as claimed in claim 15, wherein when the thickness of the relatively thick cell wall is represented by D1 and the thickness of the relatively thin cell wall is represented by D2, the ratio D1/D2 is 3 or less.

17. The ceramic filter assembly as claimed in claim 1, wherein the porous ceramic sintered material includes silicon carbide and metal silicon.

18. The ceramic filter assembly as claimed in claim 1, further comprising a catalyst.

19. A ceramic filter assembly comprising:
a plurality of columnar honeycomb filters adhered together;
the plurality of honeycomb filters being made of a porous ceramic sintered material with a ceramic sealing material layer and having end faces and a generally elliptical cross sectional shape when cut parallel to the end faces of the plurality of honeycomb filters, wherein
when a hypothetical first straight line intersects the generally elliptical contour at two points in which the distance therebetween is maximum and a hypothetical second straight line orthogonal to the first straight line intersects the generally elliptical contour at two points in which the distance therebetween is maximum, the number of sealing material layers the first straight line of the assembly traverses is less than or equal to the number of sealing material layers the second straight line traverses.

20. The ceramic filter assembly as claimed in claim 2, wherein the porous ceramic sintered material includes silicon carbide and metal silicon.

21. The ceramic filter assembly as claimed in claim 2, further comprising a catalyst.

22. The honeycomb filter as claimed in claim 15, wherein the porous ceramic sintered material includes silicon carbide and metal silicon.

23. The columnar honeycomb filter as claimed in claim 15, further comprising a catalyst.

* * * * *